Nov. 4, 1924.　　　　　　　　　　　　　　　　　　　1,514,439
C. C. COLBERT ET AL
METHOD AND APPARATUS FOR MANUFACTURING COATED PAPER BOARD
Filed July 2, 1923　　　13 Sheets-Sheet 1

Inventors:
Charles C. Colbert.
George E. Preston.
Emery, Booth, Janney & Varney Attys.

Nov. 4, 1924. 1,514,439
C. C. COLBERT ET AL
METHOD AND APPARATUS FOR MANUFACTURING COATED PAPER BOARD
Filed July 2, 1923 13 Sheets-Sheet 2
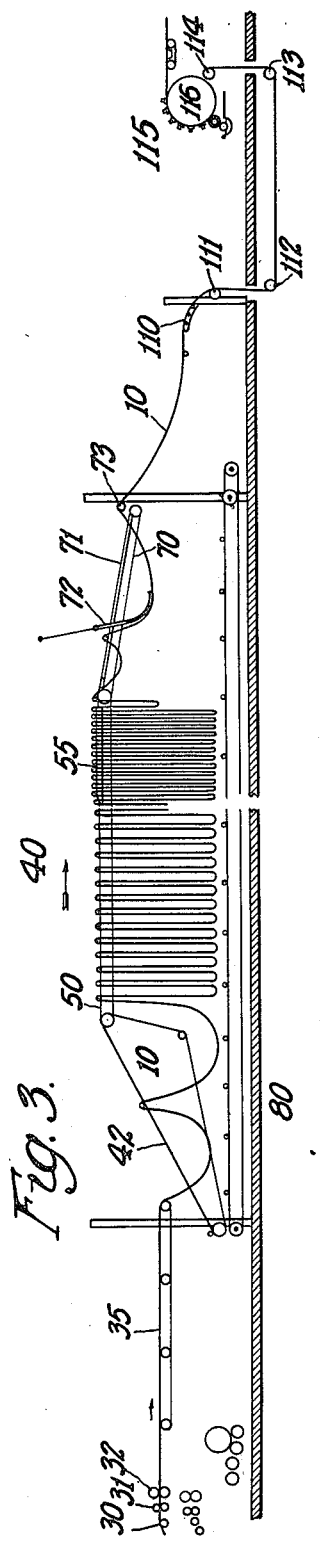
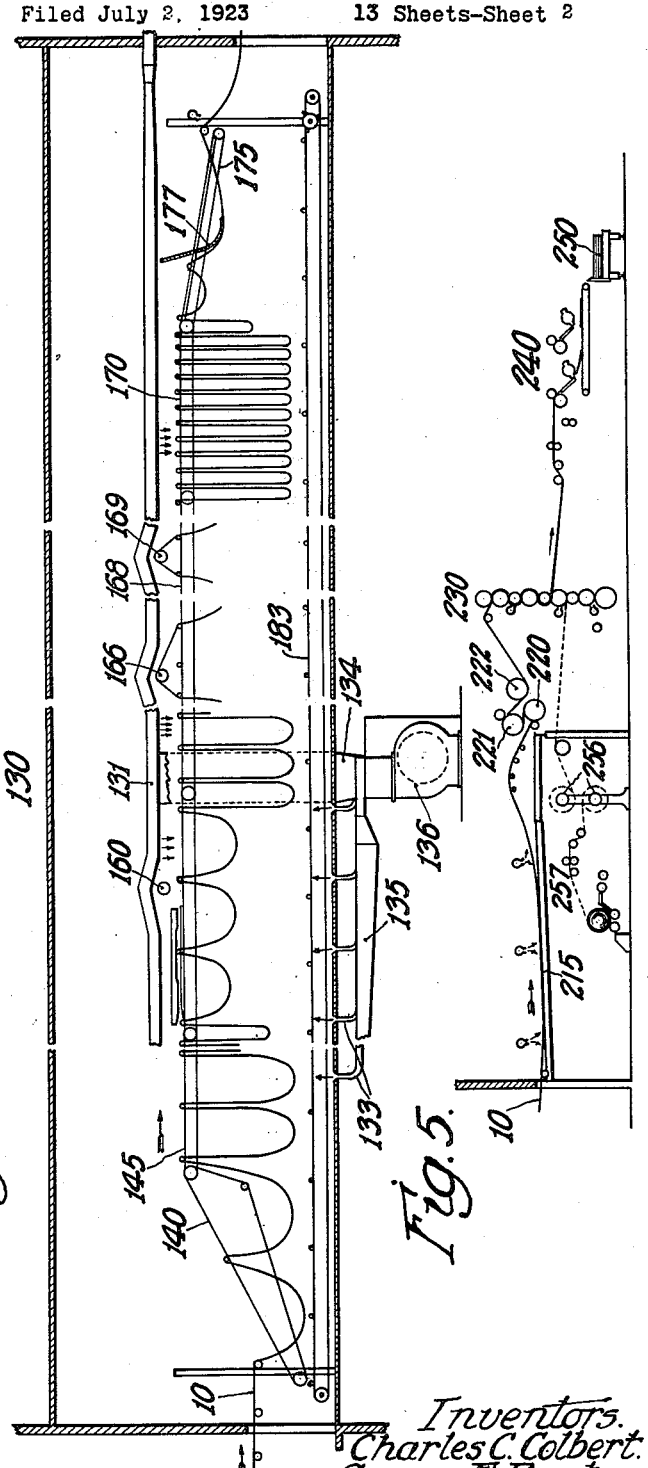
Inventors.
Charles C. Colbert.
George E. Preston.
Emery, Booth, Janney & Varney Attys.

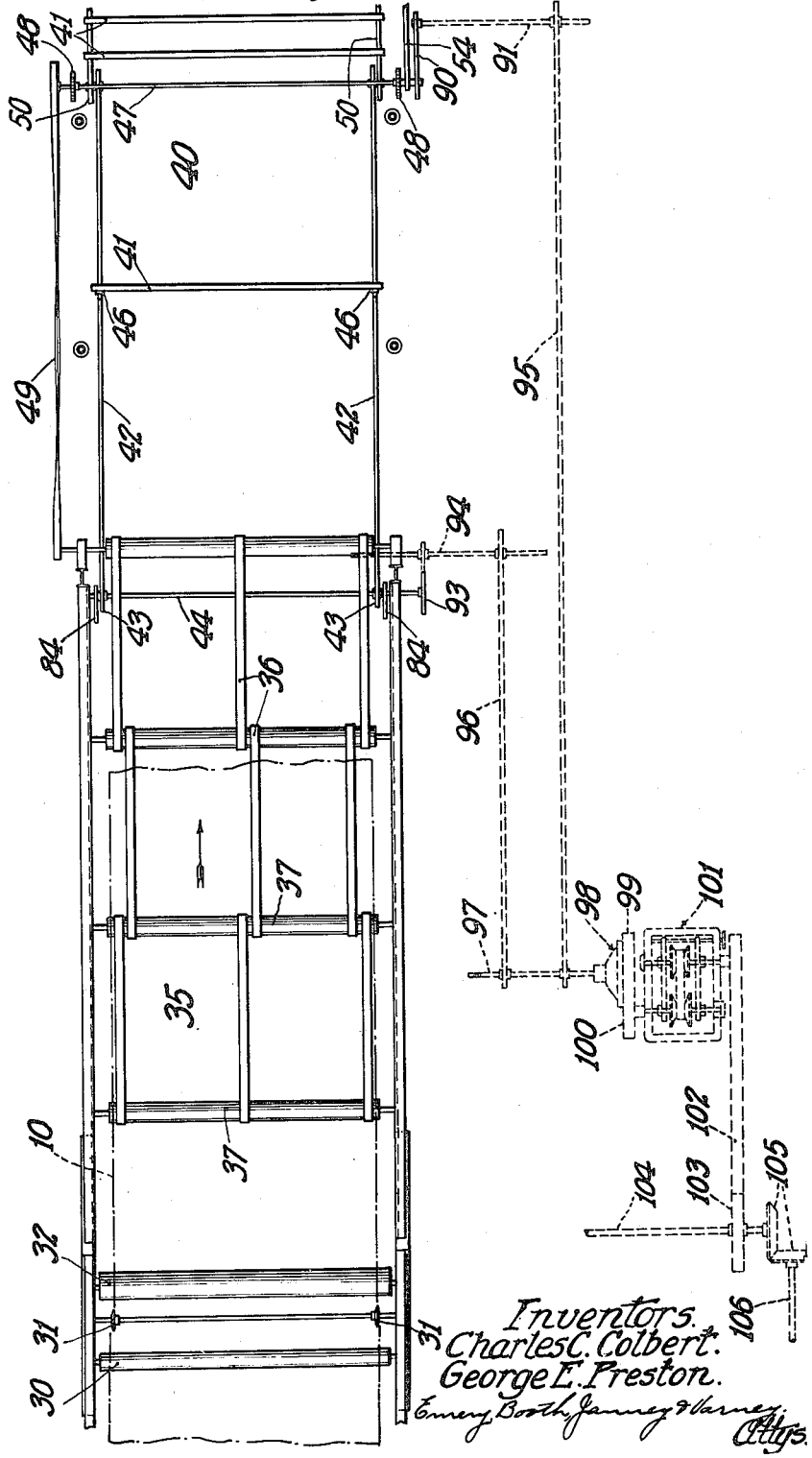

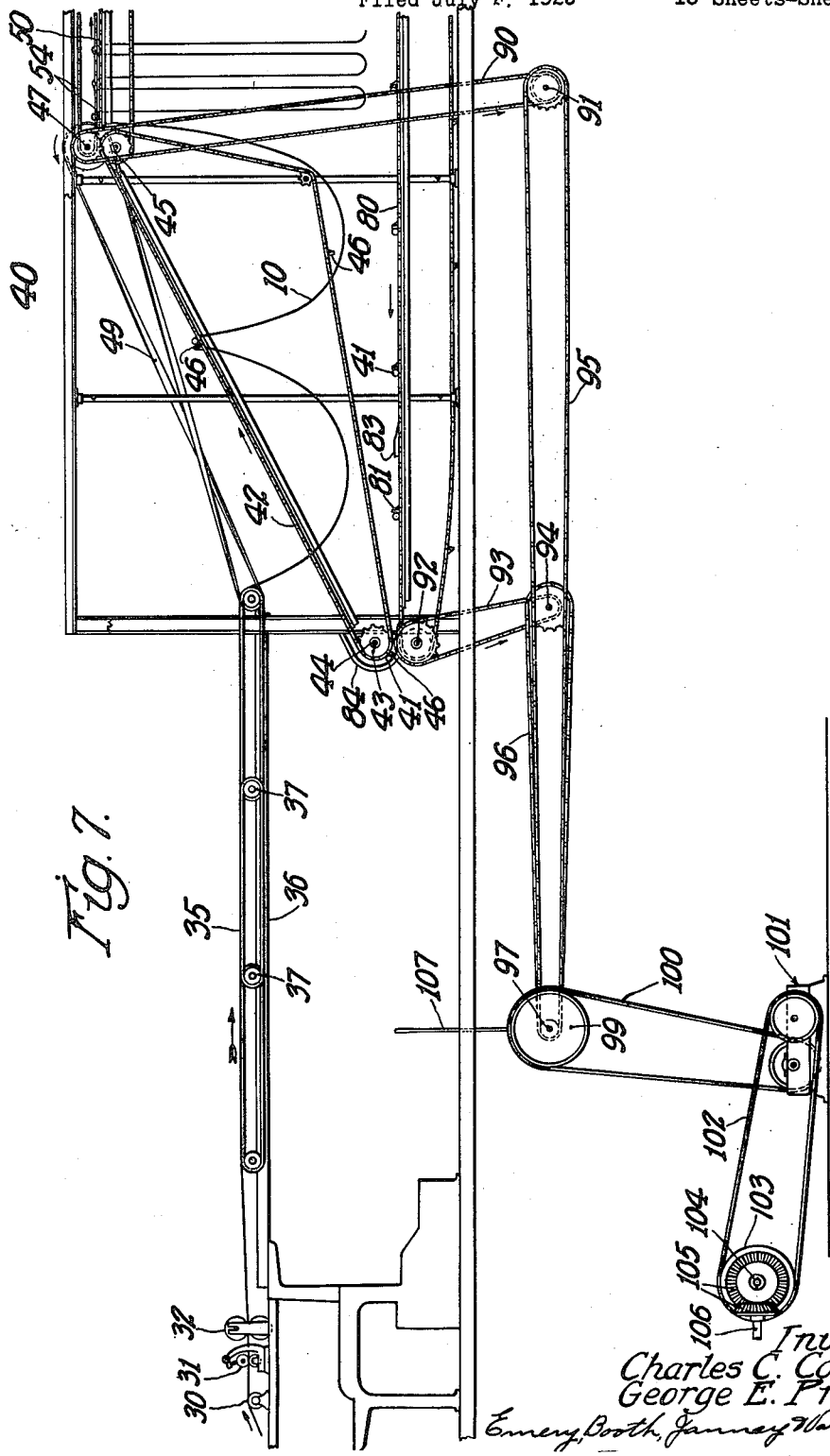

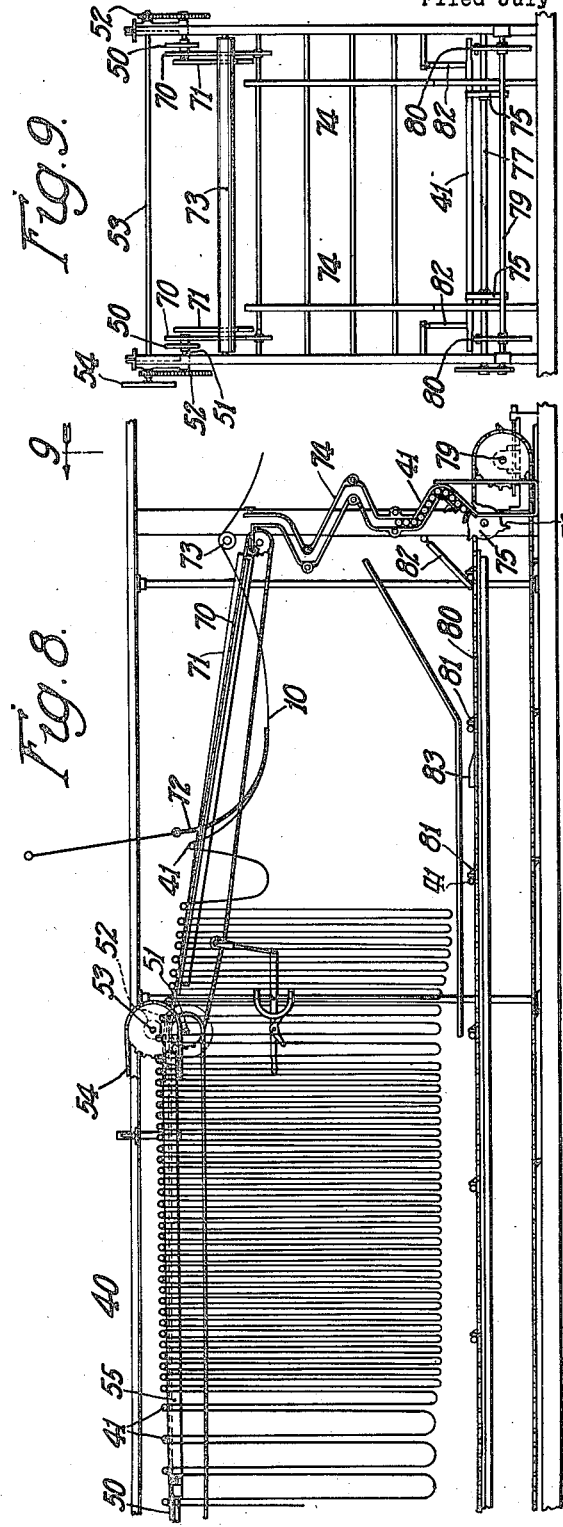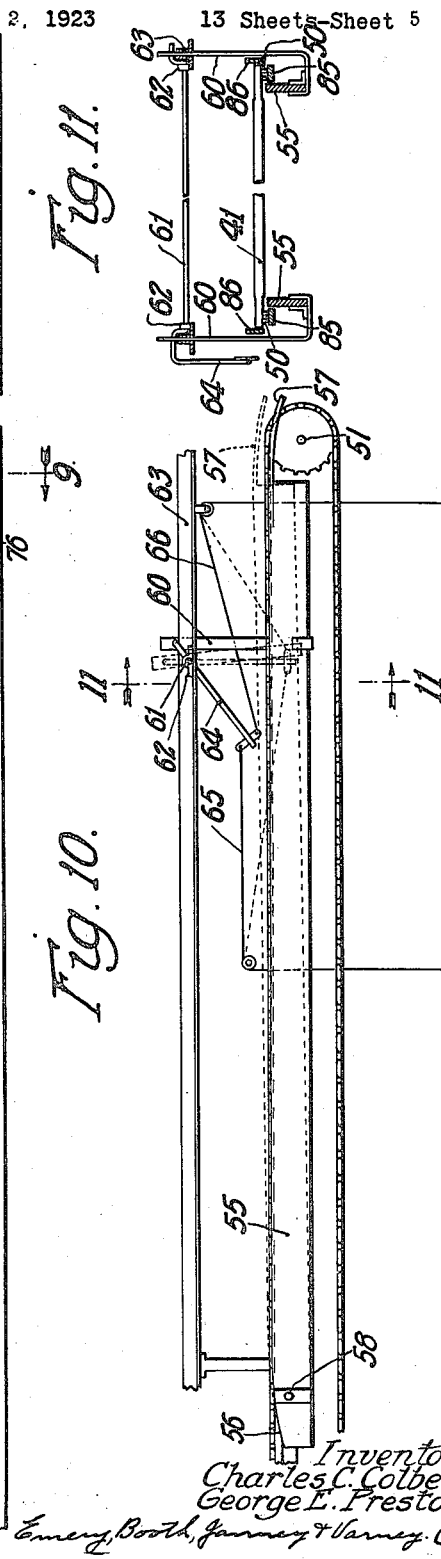

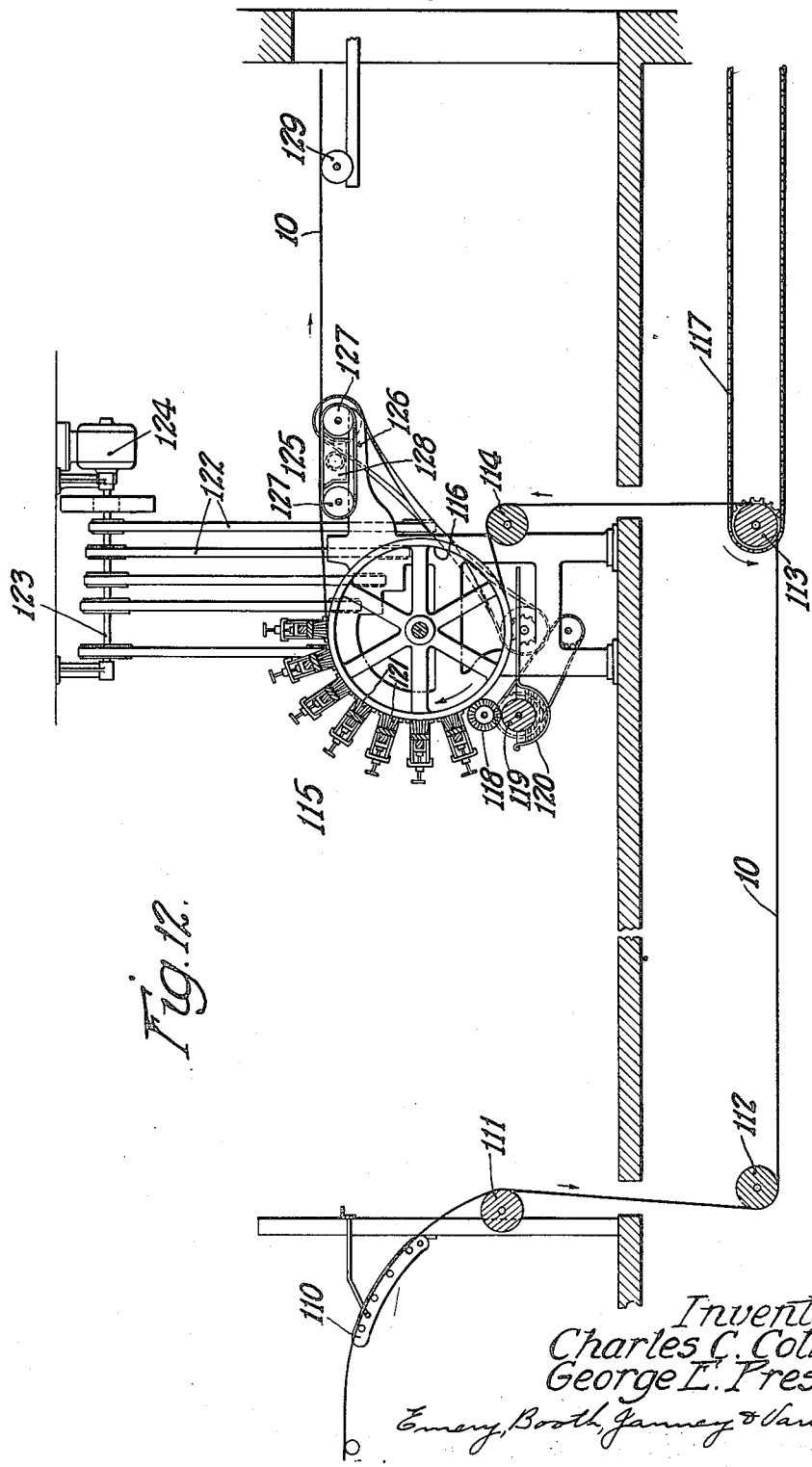

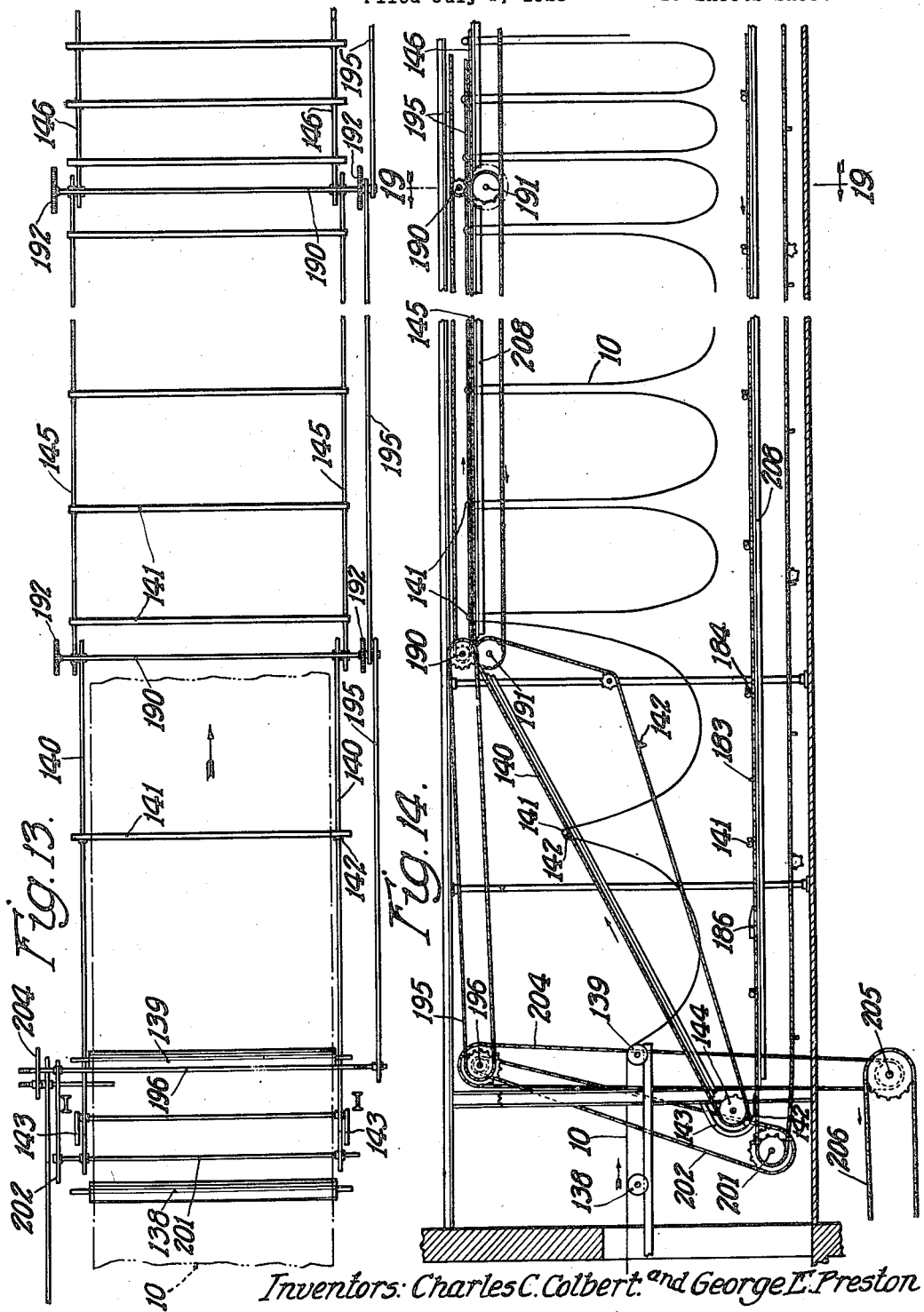

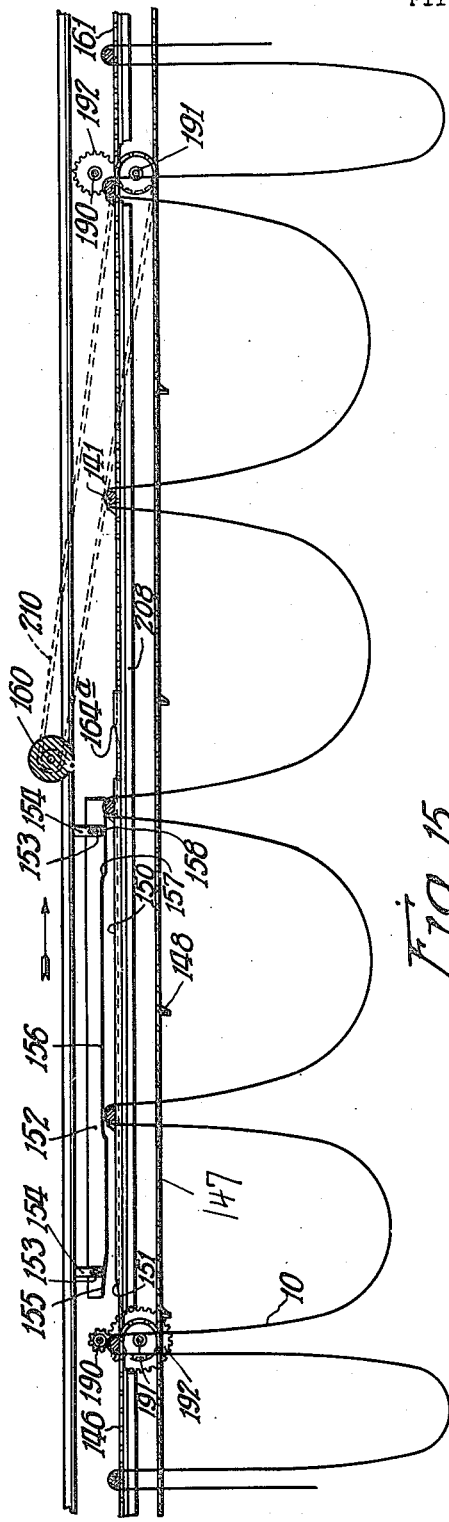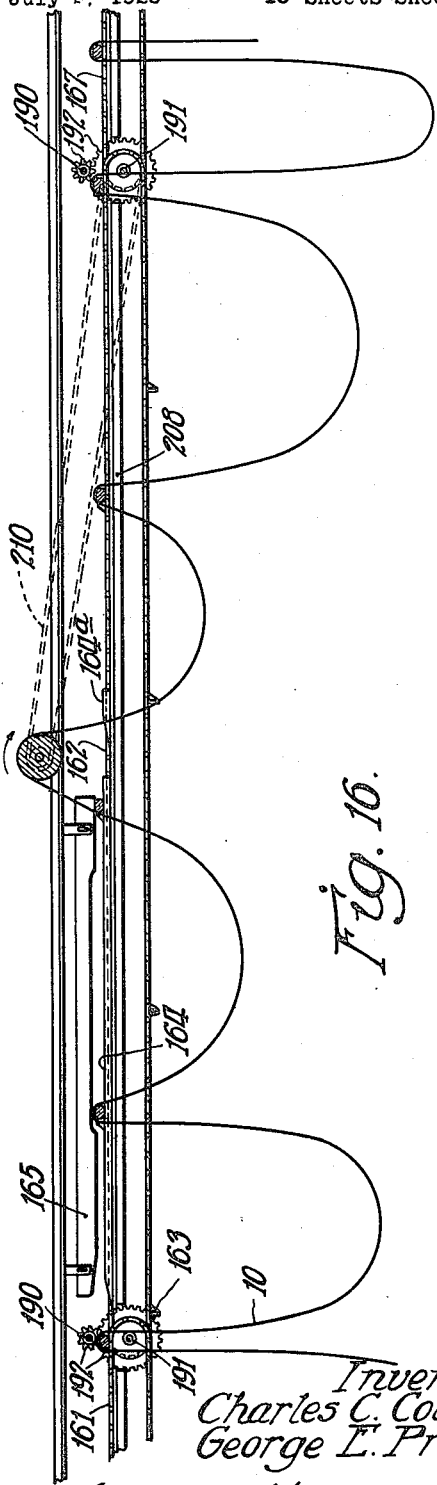

Nov. 4, 1924.　　　　　　　　　　　　　　　　　　　1,514,439
C. C. COLBERT ET AL
METHOD AND APPARATUS FOR MANUFACTURING COATED PAPER BOARD
Filed July 2, 1923　　　　13 Sheets-Sheet 9
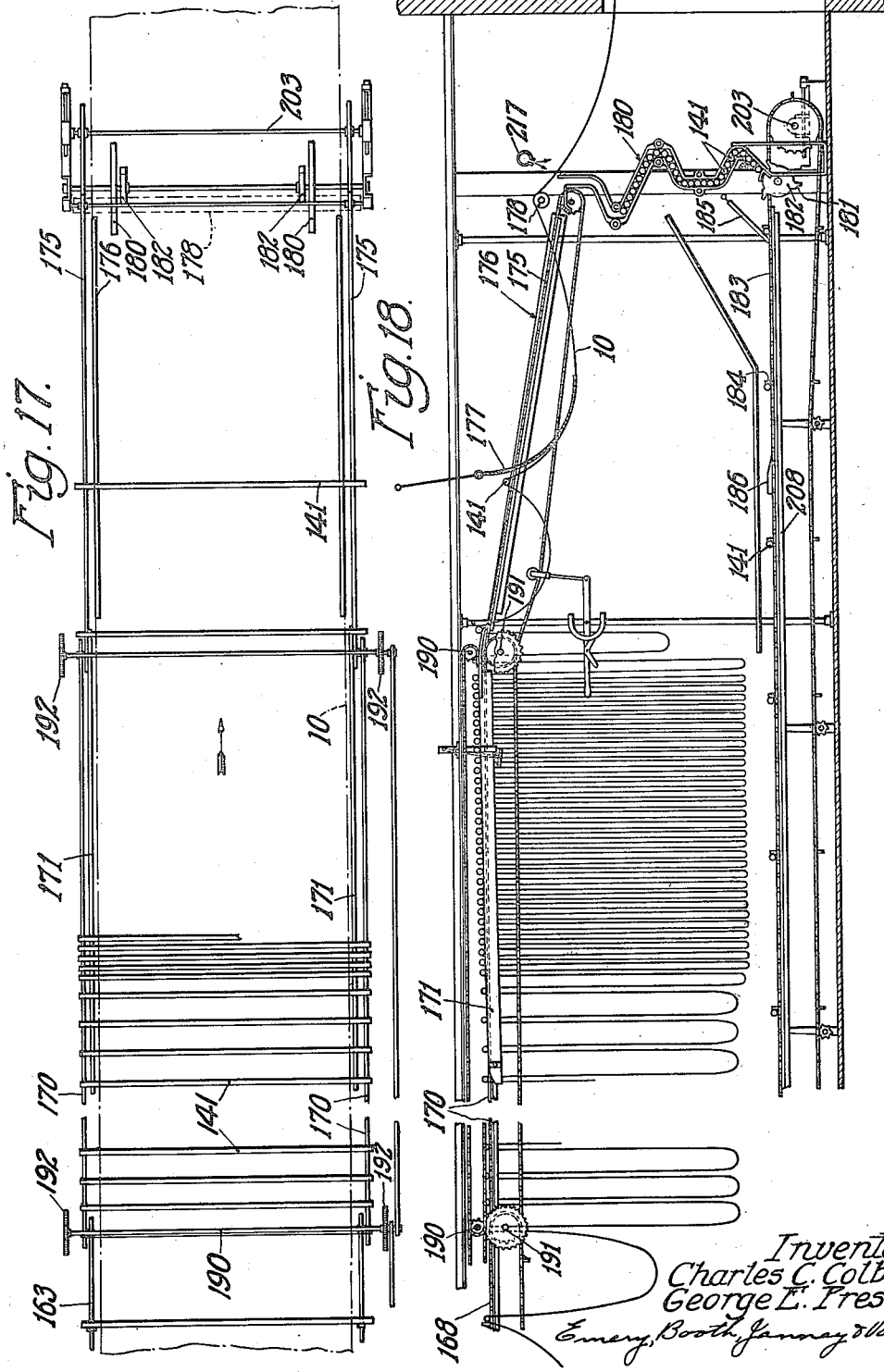
Inventors.
Charles C. Colbert.
George L. Preston.
Emery, Booth, Janney & Varney
Attys.

Nov. 4, 1924.  
C. C. COLBERT ET AL  
1,514,439  
METHOD AND APPARATUS FOR MANUFACTURING COATED PAPER BOARD  
Filed July 2, 1923   13 Sheets-Sheet 10

Inventors.  
Charles C. Colbert.  
George E. Preston.  
Emery, Booth, Janney & Varney Attys.

Nov. 4, 1924.
1,514,439
C. C. COLBERT ET AL
METHOD AND APPARATUS FOR MANUFACTURING COATED PAPER BOARD
Filed July 2, 1923    13 Sheets-Sheet 11
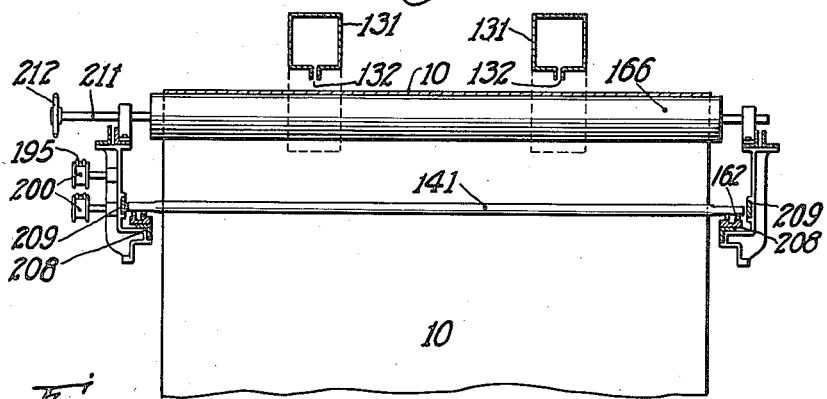
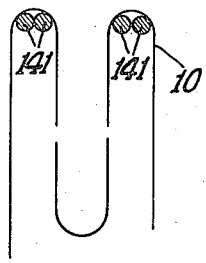
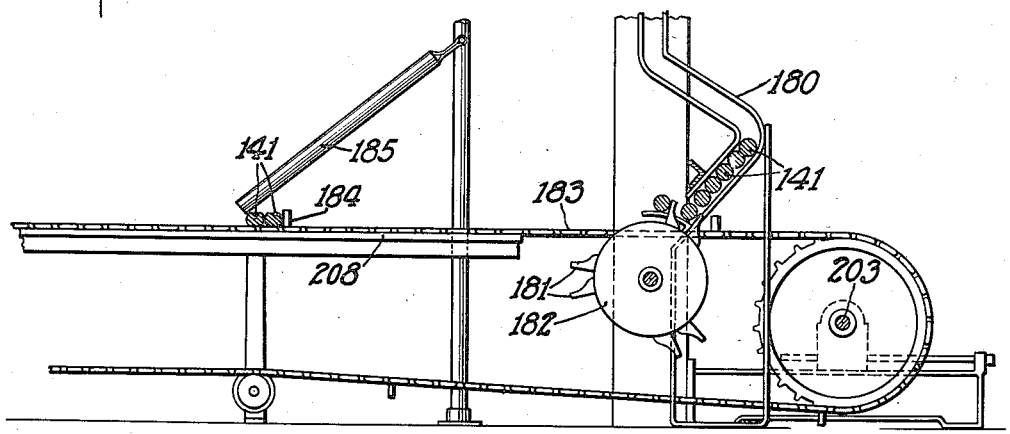
Inventors
Charles C. Colbert.
George E. Preston.

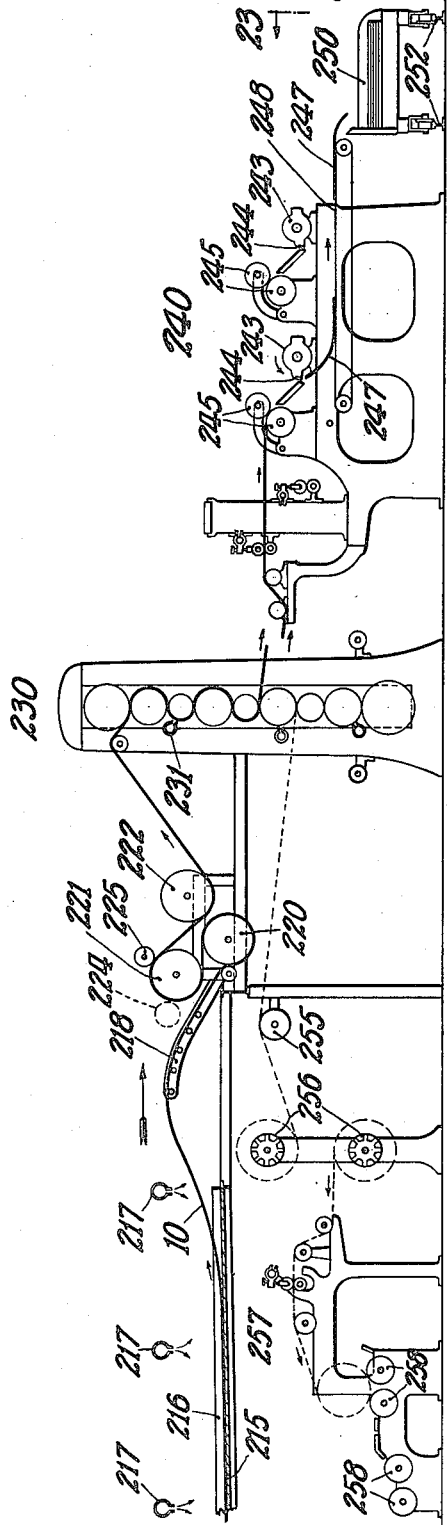
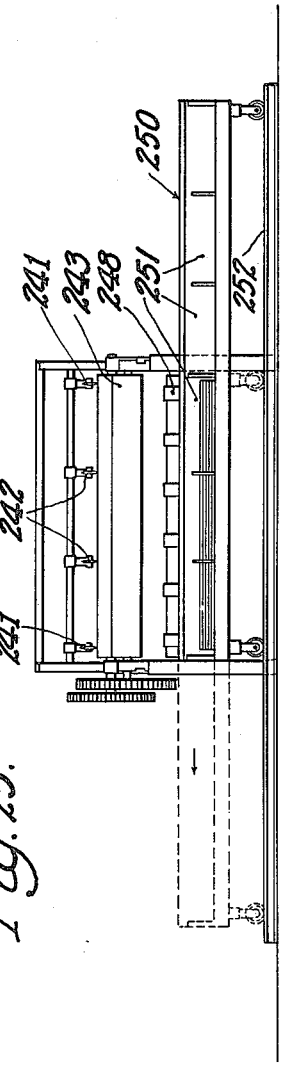

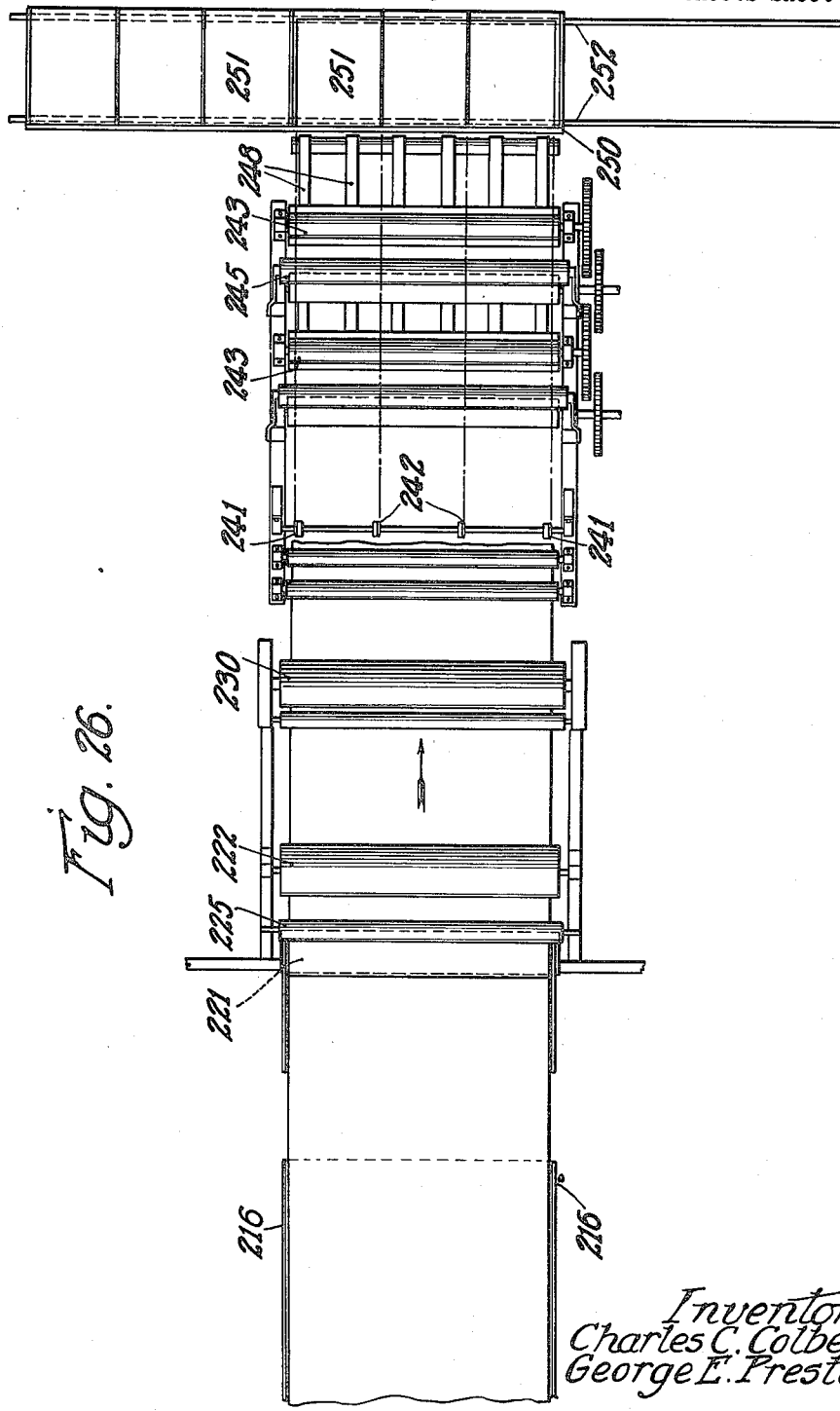

Patented Nov. 4, 1924.

1,514,439

UNITED STATES PATENT OFFICE.

CHARLES C. COLBERT AND GEORGE EDWARD PRESTON, OF ELKHART, INDIANA.

METHOD AND APPARATUS FOR MANUFACTURING COATED PAPERBOARD.

Application filed July 2, 1923. Serial No. 648,883.

*To all whom it may concern:*

Be it known that we, CHARLES C. COLBERT and GEORGE E. PRESTON, citizens of the United States, and residents of Elkhart, in the county of Elkhart and State of Indiana, have invented an Improvement in Methods and Apparatus for Manufacturing Coated Paperboard, of which the following is a specification.

This invention relates to the manufacture of coated paper board, such, for instance, as the coated board used for making cartons and boxes.

Among other objects the invention is intended to provide a practicable method and means for manufacturing coated board continuously with the formation of the raw board; to secure substantially continuous production of a uniform product of improved quality; and to effect important economies in the manufacture of coated board on a large commercial scale.

The character of the invention will be best understood by reference to an illustrative plant for practicing the invention.

In the annexed drawings:

Figs. 2, 3, 4 and 5 are diagrammatic views of sections of the plant, and collectively represent the entire plant.

Fig. 2 represents a machine for making the raw paper board.

Fig. 3 represents hang-up equipment to which the board is delivered from the board-making machine, together with a coating machine through which the board is drawn from a supply accumulated in said hang-up equipment.

Fig. 4 represents the drying room of the illustrative plant.

Fig. 5 represents equipment at the delivery end of the plant, including a finishing machine and subdividing or cutting machine.

Fig. 6 is a plan view of conveying means beyond the board-making machine and the receiving end of the succeeding hang-up apparatus.

Fig. 7 is a side view of the said conveying means and receiving end of the hang-up apparatus shown in Fig. 6.

Fig. 8 is a side view of the delivery end of said hang-up apparatus between the board-making machine and coating machine.

Fig. 9 is an end view of the apparatus shown in Fig. 8.

Fig. 10 is a detail view of a dead rack rail embodied in the hang-up equipment shown in Fig. 8.

Fig. 11 is a cross section on the line 11—11 of Fig. 10.

Fig. 12 is a side view of the coating machine.

Fig. 13 is a plan view of the receiving end of hang-up and conveying equipment in the drying room of the illustrative plant.

Fig. 14 is a side view of said hang-up and conveying equipment shown in Fig. 13.

Fig. 15 is an enlarged side view of an intermediate portion of the hang-up and conveying equipment in the drying room.

Fig. 16 is a side view of another intermediate portion of said hang-up and conveying equipment.

Fig. 17 is a plan view of the delivery end of the hang-up and conveying equipment for the drying room.

Fig. 18 is a side view of said delivery end of the drying room hang-up and conveying equipment.

Fig. 21 is a cross section of the drying room hang-up and conveying equipment, at one of the overhead rollers for shifting the board sheet relatively to its supports.

Fig. 22 is a detailed section representing successive folds of the board sheet supported each by a pair of sticks instead of by single sticks as represented in the preceding figures of the drawings.

Fig. 23 is a side view showing a portion of the return conveyor for the sticks adapted for circulating two sticks at a time instead of one.

Fig. 24 is a side view of the equipment at the delivery end of the plant, including the finishing and subdividing machines.

Fig. 25 is an end view of the machine for subdividing or cutting the finished coated board into sheets and distributing the cut sheets.

Fig. 26 is a plan view of the equipment shown in Figs. 24 and 25.

It will be observed that the several machines and appliances employed in the illustrative plant are arranged for successive operation upon board running continuously from a source of supply of wet stock for formation of the raw board.

The continuous board being manufactured in the plant is indicated by the numeral 10 throughout the drawings.

Figure 1:
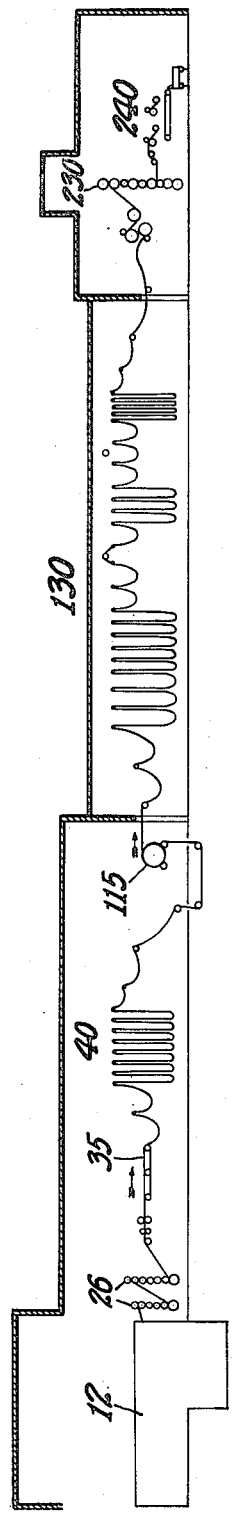
Fig. 1 is a diagrammatic view of the illustrative plant.
Figure 2:
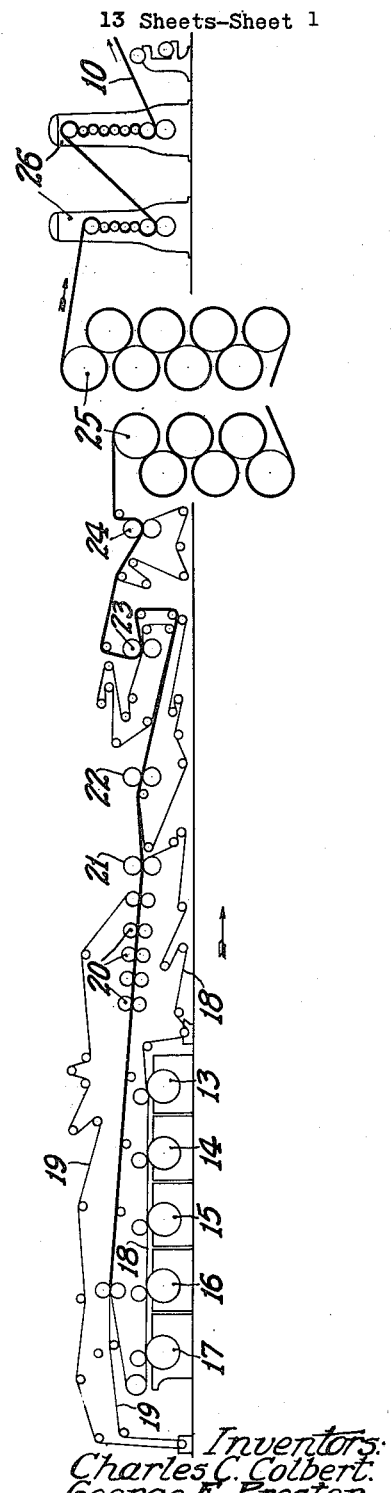

A machine for continuously forming the raw board is indicated at 12 in Fig. 1, and is diagrammatically shown in Fig. 2.

Referring to Fig. 2, the wet end of the board-making machine, as herein illustrated, comprises a series of cylinder molds, 13, 14, 15, 16, 17. Layers of pulp collected by the respective cylinder molds are successively applied to an endless felt 18, thereby forming the wet laminated board web. Ordinarily the first and last cylinder molds 13 and 17 are supplied with superior stock, such for instance as white or manila stock, while the intermediate cylinder molds 14, 15, 16 are supplied with inferior stock, such for instance as ordinary newspaper stock, so as to form the board as a laminated web of cheap stock surfaced or lined with superior stock which will calender with a fine finish as is desirable for the subsequent application of the liquid coating.

The wet board web forming continuously on the felt 18 is carried by said felt and a coacting felt 19 between a series of presses or squeeze rolls 20, which squeeze out the surplus water from the web; and the web is then passed through a succession of ordinary presses 21, 22, 23, 24; the several presses being associated with suitable felts to assist in conveying the wet web and for absorbing the water and moisture expressed from the web as it passes through the presses.

From the presses, the damp board is passed to the dryers 25, shown as comprising ordinary steam heated cylinders or drums in contact with which the board sheet is carried for heating and evaporating its moisture. For compactness, the drying cylinders 25 are shown arranged in a number of vertical stacks, only the first or last of which stacks are shown, it being understood that there would ordinarily be a number of intermediate stacks of drying rolls to provide drying equipment of ample capacity for drying the particular material under treatment.

The board runs from the dryers through one or more sets of calenders 26, and is thus continuously produced in dry and calendered condition. It may be noted that the calendered surface of the board for application of the coating is that supplied by the liner of white or superior stock from the last cylinder mold 17, this being the top surface of the board.

Referring to Figs. 6 and 7, the board delivered from the calenders of the board-making machine is shown running over an elevated guide-roller 30 and between rollers 32, the upper one of which bears yieldingly upon the board sheet; and between said rollers are coacting cutting disks 31, a pair at each side of the board sheet, arranged for trimming the edges of the board sheet as it runs off from the calenders.

From said rollers and cutting disks, 30, 31, 32, the board is shown carried by a conveyor 35 to the hang-up equipment 40 (Figs. 3, 6 and 7). Said conveyor 35, as shown in Figs. 6 and 7, may comprise endless tapes 36 trained around power-driven rollers 37. The conveyor is arranged at such an elevation as to provide a convenient passageway under the conveyor from one side of the plant to the other, with ample head room for attendants to pass to and fro and with considerable clear floor space under the running board sheet for installation of auxiliary machinery and other purposes.

The conveyor 35 delivers the board to hang-up equipment 40 (Figs. 3 and 6 to 9 inclusive). This hang-up equipment collects the board in loosely hanging festoons or folds, and conveys the successively accumulated folds slowly for a considerable distance toward the coating machine 115 (Fig. 3), whereby the freshly produced raw board, before undergoing the coating operation, is subjected to a seasoning process by prolonged exposure to the atmosphere while in hung-up condition. The accumulation of board in the hang-up equipment also provides a flexible supply of slack board, from which supply of slack the seasoned board can be withdrawn and run through the coating machine independently of the rate of production of the raw board in the board-making machine, and without liability of causing breaks in the board sheet between the calendering and coating operations.

In the illlstrative hang-up apparatus, the board hangs from a number of transverse supports or so-called sticks 41, which are carried by a system of parallel conveyors, shown as endless sprocket chains, spaced apart appropriately to support the ends of the sticks while allowing the festoons of board to hang between the conveying chains. Said sticks 41 preferably consist of round wooden poles of large enough diameter to provide ample supports from which the board may hang without sharp bending. The ends of the sticks may be flattened to allow them to rest upon their conveying chains without tendency to roll or turn on the chains.

As the board is delivered to the hang-up apparatus, sticks 41 are successively placed under the board at appropriate intervals of time to hang up the board in festoons. For this operation, the illustrative hang-up apparatus includes at its receiving end a pair of elevating chains 42 (Figs. 6 and 7), shown running at an upward inclination from sprocket wheels 43 on shaft 44 to sprocket wheels on stub shafts 45. Said chains 42 are provided at suitable intervals with lugs 46 for supporting and forwarding the sticks. These elevating chains 42 may conveniently be driven from an overhead shaft 47 suitably geared as shown at 48 with the stub shafts 45 on which the driving sprockets for said chains are affixed. From the same overhead shaft 47, power may be communicated by the belt 49 to the conveyor 35 which delivers the board to the hang-up apparatus.

The elevating chains 42 deliver the sticks to longitudinally running carrier chains 50, which convey the sticks with the hanging festoons of board to the delivery end of the hang-up apparatus (Figs. 8 and 9), whence the board may be withdrawn and passed through the coating machine as hereinafter explained.

Said chains 50 are shown running from sprocket wheels at the receiving end which may be loosely mounted on the stub shafts 45 of the driving sprockets for the elevating chains 42 (Figs. 6 and 7); while at the delivery end (Figs. 8 and 9) said chains 50 run around and are driven by sprockets mounted on stub shafts 51 driven by suitable gear connections 52 with an overhead shaft 53 which in turn may be driven by a chain 54 from the overhead shaft 47 (Figs. 6 and 7).

The rate of movement of the carrier chains 50 may be considerably slower than the speed of the elevating chains 42, so as to cause the sticks to be deposited upon the conveyors 50 at closer intervals than upon the chains 42, and to hang the board in closer folds, though without contact of one fold with another. Furthermore a relatively slow speed of the conveyors 50 is desired to carry the hanging board at a slow rate toward the coating machine for the purposes of subjecting it to a sufficient seasoning operation and also for the purpose of accumulating the board under conditions most favorable to maintenance of a flexible supply suitable to various conditions which may arise in the operation of the plant.

As the board hangs in festoons all along the length of the longitudinally running carrier chains 50, which may be of considerable length, say from fifty to one hundred feet or more, it will be seen that a large quantity of board is stored in the hang-up apparatus, prior to running the board sheet through the coating machine. It may be desirable to vary the amount of storage, either for the purpose of controlling the period of seasoning, or for accommodating the accumulation of slack board to conditions arising in the operation of the plant.

For instance, the operation of a coating machine must be occasionally interrupted for changing the coating brushes or colors, or treating the liquid coating material, cleansing or for other purposes. On the other hand, it is a practical necessity to maintain the board-making machine in continuous operation, since stoppages of said machine are exceedingly costly, as is well understood by those familiar with the art. Hence during any temporary interruptions of the operation of the coating machine the hang-up apparatus should continue to store the board delivered from the board-making machine without necessitating continued withdrawal of the board from said hang-up apparatus. On the other hand, in event of accident necessitating a temporary shutdown of the board-making machine, it is desirable to have an ample reserve supply of board in the hang-up apparatus from which the coating machine may continue to draw its supply.

The illustrative hang-up apparatus embodies provision for varying the amount of accumulation of the board in several ways. In event of stoppage or slowing of the coating machine the hanging folds of board can crowd together in the delivery end of the apparatus as shown in Fig. 8. Considerable variation of accumulation may also be obtained by a speed adjustment hereinafter described. In addition to these provisions, a large reserve supply of the hanging board may be stored at will in the hang-up apparatus by means now to be described.

Associated with the carrier chains 50 is a dead rack comprising longitudinal bars or rails 55, one beside each of the parallel chains 50 (Figs. 8, 10 and 11). These longitudinal bars 55 extend from a point considerably in advance of and to the delivery ends of the chains. They are supported so as to permit them to be depressed below the levels of the carrying runs of the chains, in the position shown in Figs. 10 and 11, which is their normal position, or to be elevated above the chains in the position shown in Fig. 8. The rear ends of said bars 55 are suitably tapered or bevelled as indicated at 56 so that, when the bars are in the elevated position shown in Fig. 8, the sticks 41 carrying the festoons of board may easily ride onto the dead rack bars 55, after which the sticks will be pushed along said bars one by the other. Thus a large number of the festoons or hanging folds of board may be accumulated closely on the dead rack. The delivery ends of said bars 55 are shown provided with curved extensions 57 (Fig. 10), which in elevated position will overlie the sprocket wheels of the carrier chains and permit the sticks to be discharged from the delivery end of the dead rack.

In the specific construction shown in the drawings, the dead rack bars 55 are pivoted at their receiving ends to suitable supports, indicated at 58 (Fig. 10), while their delivery end portions are carried by hangers 60, suspended from cranked portions of a crank shaft 61, journaled in bearings 62 in the upper frame work 63 of the hang-up apparatus. One of the cranked portions of the crank shaft 61 is provided with an operating lever 64, which may be operated in one direction or the other by pull cords 65 and 66. By means of the lever 64 the cranked portions of the crank shaft may be moved to a position of dead centers with respect to the bearings of the crank shaft, thus supporting the dead rack bars 55 in elevated position, and the parts may be maintained in this position by maintaining the pull cords 65 and 66 taut and fastening them at any convenient place.

An additional reserve rack of the character described may if desired be provided in advance of that shown, so as further to increase the accumulating capacity of the hang-up apparatus if required. For instance, if a suspension of operation of the coating machine should be necessitated for a longer period than that required to fill the reserve rack shown in Fig. 8, a preceding similar rack may be brought into play, so that the successively advancing sticks carrying the festoons of board will ride onto said preceding rack and collect in close relation before being redelivered to the conveyor chains.

At the delivery end of the illustrative hang-up apparatus (Figs. 8 and 9), means are provided to facilitate withdrawal of the board from the accumulated supply hung up in said apparatus. For this purpose the carrier chains 50 deliver the sticks 41 carrying the suspended folds of board upon declined conveyor chains 70, from which the sticks are delivered to declined rails 71 arranged beside said chains 70 and gradually rising to an elevation above the chains. The board is withdrawn from the sticks resting on said rails 71, while the sticks slide down the rails and are discharged.

If the dead rack bars 55 are depressed, as shown in Fig. 10, the sticks 41 will ride from the chains 50 onto the chains 70 and thence onto the rails 71, and the sticks will be caused to slide down the rails under the drag of the hanging board as it is drawn to the coating machine.

If the withdrawal of the board from the hang-up apparatus should be interrupted by temporary interruption of the coating operation, the sticks may crowd together and accumulate on the declined rails 71 as shown in Fig. 8; and, if the interruption of withdrawal is for a longer period than that which can be accommodated by the accumulating capacity of said rails, the dead rack bars 55 may be elevated, as before explained, thus allowing the successively advancing sticks carrying the festoons of board to collect in crowded condition on said bars. Upon resumption of the operation of the coating machine, the dead rack bars 55 may be depressed to allow the sticks to rest again upon the conveying chains 50, which will deliver the crowded sticks onto the chains 70 and thence onto the declined rails 71; and the operating of the coating machine may be temporarily speeded to effect more rapid withdrawal of the board until the excess accumulation is drawn off and normal conditions restored.

The declined chains 70 at the delivery end of the hang-up apparatus are shown running from driving sprocket wheels on the stub shafts 51; whereby said declined chains are driven by the same means as the longitudinal chains 50.

The pull of the board as it is withdrawn from the hang-up apparatus drags the sticks down the declined rails 71 to cause them to slide down the rails and to be discharged. There may frequently be a number of sticks in crowded condition on the rails. To prevent the pull of the board from dragging the sticks and the crowded festoons of board too rapidly down the rails, and to prevent jerking of the board from the successive folds, a suspended or swinging wiper 72 (Figs. 3 and 8) is provided in the form of a sheet of carpet or other heavy flexible material which rests upon and drags against the board and exerts a retarding action on the sticks.

The board passes from the hang-up apparatus over a guide roller 73 while the sticks 41 pass from the rails 71 onto the delivery ends of the chains 70 and are deposited into a magazine comprising a parallel pair of zig-zag shaped guides 74 (Figs. 8 and 9). The sticks are successively ejected from the lower end of the magazine by wheels 75 having ejecting lugs 76, there being a suitable opening at the lower end of the zig-zag shaped guides to permit the ejection.

Said ejecting wheels 75 are mounted on shaft 77 driven by chain 78 from shaft 79 of the sprocket wheels for a return conveyor 80. The ejected sticks are carried by the chains of the return conveyor 80 back to the receiving end of the hang-up equipment. Said chains are provided at suitable intervals with lugs 81 for engaging and forwarding the sticks. As the sticks are successively ejected from the magazine, swinging bumpers 82 knock against the sticks to steady them and prevent them being thrown too far. As a means for straightening or aligning the sticks crosswise on the return conveyor, inclined obstructors 83 are placed in the path of the sticks, over which the sticks must ride, thus insuring their lodgment against the lugs 81 on the return conveyor chains and their delivery to the receiving end of the hang-up equipment in proper transverse alignment.

At the receiving end of the hang-up equipment (Figs. 6 and 7), the chains of the return conveyor 80 deliver the sticks into curved guide-ways 84 associated with the sprocket wheels 43, and the lugs 46 on the elevating chains 42 pick up the sticks and carry them successively under the board sheet as already explained. Thus the sticks are circulated back and forth through the hang-up equipment and a reserve supply of sticks is maintained in the magazine 74 (Fig. 8), to permit variation in the number of sticks employed at a given time according to conditions existing as to capacity of accumulation of the board, as determined by speed adjustment and by the manipulation of the reserve rack bars 55.

The several endless chains constituting the stick conveying system of the illustrative hang-up apparatus may have their upper runs supported on suitable rails, and may be associated with suitable side rails to prevent the sticks from shifting lengthwise, i. e. transversely of the hang-up apparatus. For instance, supporting rails for the upper runs of the conveyor chains 50 are indicated at 85 in Fig. 11, while side rails adapted to be engaged by the ends of the sticks 41 are indicated at 86 in said Fig. 11.

The conveying system of the hang-up apparatus may be driven by any appropriate mechanism, such for instance as that illustrated in the drawings. As previously explained, the driving sprockets for the elevating chains 42 (Figs. 6 and 7) are affixed on stub shafts 45 driven by gears 48 from the overhead shaft 47; while the driving sprockets for the longitudinally running carrier chains 50, and the declined chains 70 at the delivery end of the apparatus (Figs. 8 and 9) are mounted on stub shafts 51 driven by gearing 52 from the overhead shaft 53. Said overhead shaft 53 is driven by chain 54 from the overhead shaft 47 (Figs. 6 and 7). Said overhead shaft 47 is driven by a chain 90 from a shaft 91 below the floor of the plant. The driving sprockets of the return conveyor 80 are mounted on shaft 92 (Figs. 6 and 7), which is driven by a chain 93 from a shaft 94 also below the floor of the plant. These subjacent shafts 91 and 94 are driven by chains 95 and 96 respectively from a shaft 97 adapted to be connected by a clutch 98 (Fig. 6) with a pulley 99 driven by a belt 100 from a Reeves variable speed transmission mechanism, which as a whole is indicated by the numeral 101 (Figs. 6 and 7). Said Reeves mechanism 101 is driven by the belt 102 from a pulley 103 on shaft 104 connected by bevelled gearing 105 with a shaft 106 driven from the paper-making machine. A lever 107 for controlling the clutch 98 projects above the floor of the plant, as shown in Fig. 7. Thus when the board-making machine has been set in operation and has produced a sufficient length of the board sheet to commence delivery to the hang-up apparatus, the clutch lever 107 may be thrown to connect the power with the hang-up apparatus, after which the board sheet will accumulate in said apparatus for an indefinite period while being withdrawn from said apparatus to the coating machine beyond.

By means of the Reeves mechanism 101, the speed of the conveying system of the hang-up apparatus may be varied in relation to the rate of delivery of the board from the board-making machine, thereby varying the intervals of hanging up the board in festoons by the elevating chains 42, and consequently varying the amount of board in individual festoons. Thus considerable variation of the accumulating capacity of the hang-up apparatus may be effected by speed adjustment; a slight reduction or increase of speed resulting in a considerable increase or reduction in the amount of board hung up. Hence the speed may be controlled to maintain a given quantity of accumulated board between the board-making machine and the coating machine during the regular normal operation of the plant, or to accommodate variations in speed between the rate of production of the raw board and the operation of the coating machine, or to adapt speed conditions to different adjustments of the accumulating capacity of the hang-up apparatus determined by the use of the reserve racks previously described.

Briefly summarizing the operation of the hang-up apparatus, the sticks 41 are successively elevated by the chains 42 into position for hanging up the board in festoons, as it runs from the conveyor 35, and the sticks with the hanging festoons or folds of board are slowly conveyed by the longitudinal carrier chains 50 to the delivery end of the hang-up apparatus, whence the board is drawn off into the coating machine while the sticks pass down the declined rails 71 into the zig-zag guides 74 and thence onto the return conveyor 80 which returns the sticks to the receiving end of the apparatus for re-use.

Thus a flexible supply of slack board is maintained between the board-making machine and the coating machine, the amount of such supply depending upon the number and length of the festoons. A reserve supply of several folds may advantageously be normally maintained on the delivery rails 71. On the other hand, should the rate of production of the raw board overrun the rate of passage of the board through the coating machine, or in event of interruption of operation of the coating machine for changing colors, cleansing brushes or for other purposes, the sticks with the hanging folds of board may collect in the delivery end of the hang-up apparatus or may be caused to collect on the dead rack bars 55 until the operation of the coating machine is resumed. Should an excessive supply of board be accumulated, as for instance during a long interval of interruption of the coating operation, such excessive supply can be run off by temporarily speeding the coating machine at a higher speed than the board-making machine, and, after thus running out such excessive supply, the speed of the coating machine may be reduced to correspond approximately to the rate of production of the raw board. Thus the conditions of accumulation of the board in the hang-up apparatus are amply elastic to accommodate various contingencies arising in the operation of the plant.

In the manufacture of heavy board, it may be desirable to hang the board from wider supports than could ordinarily be provided by the sticks 41, when employed singly for supports as shown in the illustrative apparatus. Such wider supports may conveniently be provided by causing the sticks to circulate through the hang-up apparatus in pairs, as indicated in Figs. 22 and 23, where the supports for hanging festoons of the board during the hereinafter described drying operation are provided by a pair of sticks, instead of a single stick 41. This utilization of the sticks in pairs or groups requires no modification of the hang-up apparatus, other than the provision at the delivery end of means for returning the sticks two at a time instead of one at a time. The modified means for this purpose is similar to that illustrated in Fig. 23, which represents a portion of the stick returning means for hang-up equipment in the drying room hereinafter referred to.

It is desirable to withdraw the board from the hang-up apparatus in such manner as to take up the slack gradually and to tension the board in advance of the coating operation without subjecting it to sharp flexing or sudden stress in its passage from the hang-up apparatus to the coating machine. In the apparatus shown in the drawings (Figs. 3, 8 and 9) the swinging wiper 72 contributes to this function by exerting an initial drag on the board as it is withdrawn from the folds and over the roller 73. Beyond the delivery end of the hang-up apparatus the board is shown running over a guide 110 comprising a number of transverse rods extending between curved side bars (Figs. 3 and 12). This guide is located sufficiently beyond the delivery end of the hang-up apparatus to permit more or less sagging of the board in advance of the guide. The curved side bars of the guide serve as side guides for the edges of the board sheet to preserve the proper alignment of the board sheet as it runs to the coating machine. As the board is drawn over the curved guide, a frictional resistance is exerted contributing to the tensioning of the board.

From the curved guide 110, the board is shown running over a guide-roller 111 and down through an opening in the floor of the plant and under a subjacent roller 112, thence forwardly under the roller 113, then up through an opening in the floor of the plant and over a roller 114, and thence backwardly and around the coating machine cylinder 116 (Fig. 12). By thus training the board sheet around a series of rollers arranged to cause the sheet to reverse the direction of its travel, the board is gradually tensioned so that it may be drawn taut through the coating machine but without undue stretching or sudden tensioning in transition from slack to taut condition of the board. To assist the coating machine in drawing the board from the supply in the hang-up apparatus, the roller 113 may be power driven by the chain 117.

The illustrative coating machine (Fig. 12) is of a type commonly used in coating plants, comprising a cylinder 116 around which the board is trained while being subjected to the action of brushes for applying and working the liquid coating material. In Fig. 12, 118 denotes the rotating brush for applying the liquid coating. This brush rotates in contact with a roll 119 which dips into a tank 120 containing the coating material, such for instance as a solution of clay with or without coloring pigments. Said tank 120 may be continuously supplied with the desired liquid coating material by any suitable pipe connections (not shown) with a source of supply.

Above the rotary brush 118 are a number of brushes 121 which reciprocate longitudinally of the coating machine cylinder for brushing the coating material thoroughly and smoothly upon the board. In the illustrative machine, the operating shafts for the series of reciprocating brushes are driven by the belts 122 from the overhead shaft 123 which is operated by a motor 124 independent of the motor (not shown) which drives the coating machine cylinder and the rotary brush 118 for applying the liquid coating. This permits the speed of the reciprocating brushes to be adjusted as required independently of the speed of the coating machine cylinder. The coating machine may be driven through any appropriate means permitting variation in speed, as is desirable to accommodate conditions with respect to the amount of board stored up in the hang-up apparatus, as before explained.

The board must be run through the coating machine in such manner as to expose the desired surface to be coated, which in this instance is the top calendered surface of the board formed by the liner of superior stock supplied by the last cylinder mold 17 of the wet end of the board making machine (Fig. 2). Furthermore the board must be run off from the coating machine cylinder without contact of its coated side with supporting means or other objects, and should preferably be run off in a horizontal direction in order to avoid tendency of streaking or waving of the wet coating material. These problems are met in the illustrative plant by running the board sheet beyond the axis of the coating machine cylinder and thence backwardly under and around and off from the top of the cylinder, as illustrated for example in Fig. 12. Thus the board is drawn forwardly to the coating machine cylinder and around the cylinder without inverting the board, causing its top calendered surface to be submitted to the action of the brushes.

By running the board sheet under the floor of the plant a suitable distance in advance of the coating machine cylinder, and thence upwardly and around the cylinder, a clear floor space and transverse aisle from side to side of the plant is provided in front of the coating machine, as is required for the use of operatives and attendants at the coating machine.

The board is shown running from the coating machine cylinder over a suction appliance 125 (Fig. 12) and thence over a supporting roller 129 and into the drying room 130 (Fig. 4). The said suction appliance 125 may comprise an endless cloth 126 travelling around power driven rollers 127 and over a stationary suction box 128, to assist in causing the coating to adhere and set.

Figure 19:
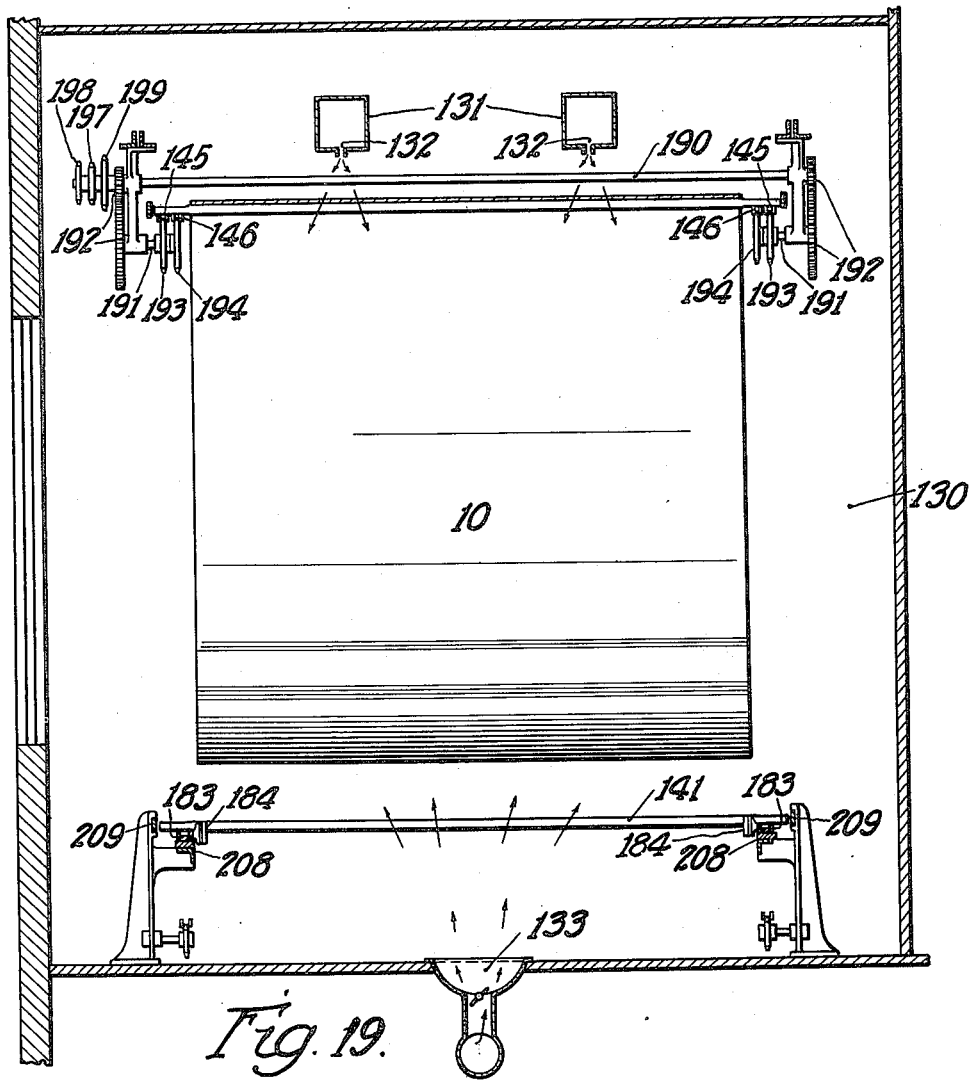
Fig. 19 is a cross section of the drying room taken at the juncture of successive pairs of conveying chains.

In the drying room 130 (Fig. 4), the coated board is hung up and conveyed in loosely hanging festoons or folds while undergoing drying treatment. It is desirable to convey the hanging festoons of board for a certain distance without exposure to drying influence other than the air of the room, in order to permit a gradual initial drying of the coated surface of the board; and then to subject the board to a more pronounced drying action to promote rapid and effective drying in the passage of the board sheet through the room. Thus in the drying room of the illustrative plant the hanging festoons of board are conveyed by one or more sets of chains of the hereinafter-described conveying system for a considerable distance beyond the receiving end of the drying room without exposure of the coated surface of the board to forced drying action; while beyond a certain point hot air is blown upon the hanging festoons of board from a pair of overhead longitudinal air ducts 131 having slots 132 in their under sides for discharging the heated air (Figs. 19 and 21). Hot air is also discharged upwardly and under the hanging folds of board from a number of nozzles 133 in the floor of the drying room (Figs. 4 and 19). In Fig. 4, manifolds for supplying the hot air to the overhead ducts and the bottom nozzles are respectively indicated at 134 and 135, these manifolds being connected with a suitable blowing apparatus 136 which may be supplied with the hot air from any suitable source; or if preferred air may be heated in the blowing apparatus by a steam pipe coil or otherwise.

The apparatus for hanging up and conveying the board through the drying room (Fig. 4) is generally similar to the previously described hang-up apparatus between the board-making and coating machines, but in this instance is associated with certain additional features of specific importance to the drying operation. The drying room equipment illustrated in the drawings will now be described with particular reference to Figs. 13 to 21 inclusive.

In Figs. 13 and 14, the board is shown running into the receiving end of the drying room over supporting rollers 138 and 139, and being hung up in festoons on sticks 141 which are successively brought into position for hanging up the board by a pair of elevating chains 140. Said chains are provided at appropriate intervals with lugs 142 which pick up the sticks from curved guides 143 associated with the chain sprocket wheels 144, the sticks being successively delivered to said guides by a return conveyor 183 as in the case of the hang-up apparatus first hereinbefore described.

The elevating chains 140 deliver the sticks 141 to longitudinal carrier chains 145 running at appropriate speed to space the sticks at fairly wide intervals so as to keep the board hanging in wide festoons; and these chains 145 convey the sticks with the hanging festoons of board for a desired distance for a preliminary drying of the freshly applied coating by exposure to the heated air of the drying room.

Chains 145 deliver the sticks to chains 146 (Figs. 13 and 14) running at somewhat slower speed than the chains 145, so as to receive the sticks at closer intervals and contract the hanging festoons or folds of board, for the purpose of increase of accumulating capacity; and these chains 146 convey the board thus hung for a further desired distance, and within the range of the hot air currents discharging from the overhead ducts 131, for continued drying.

From the chains 146, the sticks are transferred to carrier chains 147 (Fig. 15) running at relatively faster speed than the preceding chains and adapted to convey the sticks at wider intervals apart so as to spread out the festoons of hanging board.

Associated with said last mentioned chains (Fig. 15) is a means presently to be described for effecting a longitudinal shifting of the board relative to its supports, involving the withdrawal of the board from successively advanced sticks and its reengagement by said sticks. It is accordingly desirable to prevent dislocation of the sticks during such shifting operation. For this purpose, and to ensure desired spacing and correct transverse alignment of the sticks, said chains 147 are provided with lugs 148 for engaging and forwarding the sticks, and certain retarding devices are arranged to resist the movement of the sticks and thus maintain them against the lugs. The specific means shown is as follows: Rails 150 are arranged beside the carrier chains 147, said rails having their upper surfaces bevelled at the front end at 151 and rising above the level of the chains but not above the projections of the chain lugs 148. Hanging above these rails 150 are bars 152 of the form shown in the drawings. These bars 152 are connected by slot and bolt connections 153 to the hangers 154, permitting the bars to be raised.

A stick 141 transferred from the chains 146 to the chains 147 (Fig. 15) rides up the bevelled ends 151 of the rails 150 and against the under bevelled ends 155 of the upper bars 152. This causes the stick to stop until its ends are engaged by an opposite pair of the chain lugs 148 on the parallel carrier chains 147. The chain lugs then push the stick between the rails 150 and upper bars 152, the said upper bars being lifted by the stick. Said upper bars may have their under surfaces recessed at 156 to relieve the sticks of the weight of said bars. Before passing out from between the rails 150 and bars 152, the stick again engages the upper bars at 157 and is forced out between the rail and the under surface 158 of the bar bearing on the stick. After passing the bars 152, the stick may be caused to ride over inclined obstructors 164ᵃ. Thus transverse alignment of the sticks on the chains 147 is assured, the lugs 148 of the parallel carrier chains and the respective retarding devices being in direct alignment.

For shifting the board relative to its points of suspension, the board may be trained over a roller 160 arranged above the carrier chains 147 and running at an appropriately faster speed than said chains to effect desired lineal advancement of the board. As shown in Fig. 15, however, the overhead roller 160 is not in use, and the board continues to hang in festoons from the sticks 141 while passing through the portion of the conveying system shown in said Fig. 15.

The chains 147 transfer the sticks to chain 161 (Figs. 15 and 16). These chains 161 run at slower speed than the preceding chains for spacing the sticks at closer intervals and narrowing the hanging festoons of board.

Said chains 161 deliver the sticks to chains 162 running at relatively faster speed for the purpose of again spreading out the festoons (Fig. 16). These chains 162 are provided with lugs 163 for engaging the sticks, and are associated with the same means as in Fig. 15 for retarding the sticks until engaged by the chain lugs and for insuring the correct transverse alignment of the sticks; the means referred to comprising rails 164 and coacting upper bars 165 constructed, arranged and operating in the same manner as the corresponding rails and bars 150 and 152 of Fig. 15.

Above the last mentioned chains 161 (Fig. 16) is a roller 166 of the same character and for the same function as the overhead roller 160 of Fig. 15. The board is shown trained over this roller 166, leaving the preceding stick and being advanced by and hanging from the roller in position for reengagement by the stick beyond the roller at a different point than that previously engaged by the stick. Thus the points of suspension of the board are automatically shifted.

The chains 161 deliver the sticks to slow running chains 167 (Fig. 16) which again receive the sticks at closer intervals for narrowing the festoons.

Chains 167 (Fig. 16) deliver the sticks to chains 168 (Fig. 4). These last mentioned chains travel relatively faster than the preceding chains for again spreading out the festoons. They are identical with and associated with the same means as the conveyors of Figs. 15 and 16, the means referred to including coacting rails and upper bars (not shown) for retarding and correcting the transverse alignment of the sticks, and an overhead roller 169, as shown in Fig. 4, for shifting the points of suspension of the board.

Chains 167 deliver the sticks to slower running chains 170 (Figs. 4, 17 and 18), for again decreasing the spacing of the sticks and narrowing the festoons. By the time the hanging board is delivered to these chains it is substantially dry, and the hanging folds are collected on these chains to provide a flexible accumulation of the dried board in slack condition, from which the board may be withdrawn for finishing its coated surface.

Figure 20:
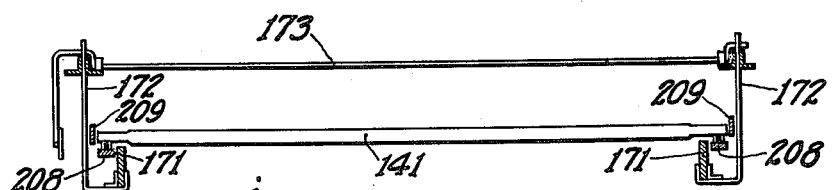
Fig. 20 is a detail cross section through a portion of the drying room conveying equipment, showing means for elevating a dead rack at the far end of the drying room.

Associated with the last mentioned carrier chains 170 (Figs. 17 and 18) is a dead rack of the same character as that employed in the hang-up apparatus between the board-making and coating machines. Said dead rack comprises longitudinal bars 171 normally below the levels of the carrying runs of the chains 170, but adapted to be elevated as shown in Fig. 18 to permit the sticks carrying the festoons of board to ride over the bevelled rear ends of the bars and to collect on the bars, where the sticks and hanging festoons will be pushed along one by another, as previously explained. In Fig. 20, the forward ends of the dead rack bars 171 are shown supported by hangers 172 suspended from cranked portions of an operating crank shaft 173 which may be operated in the manner already explained with reference to the dead rack shown in Fig. 8.

As shown in Figs. 17 and 18, the delivery end of the drying room conveying system is similar to the delivery end of the hang-up apparatus between the board-making and coating machines. The sticks 141 carrying the hanging folds of board are delivered by the chains 170, or from the dead rack bars 171 if elevated, onto declined chains 175, and the sticks ride from these chains onto the declined rails 176 arranged beside and gradually rising above the level of the carrying runs of said chains. Several sticks with the hanging folds of board may accumulate on the rails 176. As the board is withdrawn from the sticks resting on said rails, the pull of the board is retarded by the swinging wiper 177 (Figs. 4 and 18). The board is withdrawn over the roller 178, while the stick or sticks dragged by the board slide down the rails 176 onto the delivery ends of the chains 175 and are discharged into a magazine comprising zig-zag shaped guides 180. From the bottoms of these guides the sticks are successively ejected by the lugs 181 rotating ejector 182 and deposited upon the return conveyor 183 having lugs 184 to engage and forward the sticks.

Associated with said return conveyor are the swinging bumpers 185 for knocking the sticks as they are ejected, and devices for aligning the sticks across the conveyor, comprising bevelled obstacles 186 in the path of the ends of the sticks to ensure the seating of the ends of the sticks against the lugs of the opposite chains. The return conveyor delivers the sticks successively into the curved guides 143 at the receiving end of the drying room (Figs. 13 and 14), where the sticks are successively picked up and carried into position for hanging up the board by the elevating chains 140.

Where it is desired to hang the board from wider supports than those provided by single sticks, as in the case of manufacture of comparatively heavy or stiff board, the sticks 141 may be circulated through the drying room in pairs, as previously explained with reference to the hang-up equipment between the board-making and coating machines, and as shown in Fig. 22 where the festoons of board hang from successive pairs of sticks. In this instance the ejecting wheels 182 at the delivery end of the drying room (Fig. 23) are provided with pairs of ejecting lugs 181 so arranged as to cause the sticks to be deposited in pairs upon the return conveyor, as will be clearly understood from said Fig. 23.

The means illustrated for driving the conveying system in the drying room is as follows:

The elevating chains 140, and the succeeding pairs of carrier chains 145, 146, 147, 161, 162, 167, 168 and 170, are driven at their respective delivery ends by a number of overhead shafts 190 (Figs. 13 to 19). The driving sprockets for these successive pairs of chains are mounted on stub shafts 191 driven by gearing 192 from said overhead shafts 190. Beside the driving sprockets for each pair of chains, and loosely mounted on the same stub shafts which carry the driving sprockets, are idle sprockets for the receiving ends of the succeeding pair of chains. For instance, as shown in Fig. 19, driving sprockets 193 for a preceding pair of conveyor chains, and driven sprockets 194 for a succeeding pair of conveyor chains, are shown coaxially mounted on the stub shafts 191; the said driving sprockets being fast on said stub shafts and the said driven sprockets being loose thereon. Thus each pair of carrier chains runs from idle sprockets to and around driving sprockets coaxial with the idle sprockets for the next pair of chains. This description applies to all of the overhead chains except the declined chains 175 at the delivery end of the drying room, which run from driving sprockets coaxial with the driving sprockets of the preceding carrier chains (Figs. 17 and 18).

The several overhead shafts 190 may be driven by a system of chains 195 (Figs. 13 and 17) from a shaft 196 (Figs. 13 and 14). As shown in Figs. 13 and 17, the transmission chains 195 may run from one shaft to another around sprocket wheels of appropriate proportions to maintain the desired relative rates of speeds of the successive paths of carrier chains. For instance, in Fig. 19 the overhead shaft 190 is driven by a chain engaging the sprocket wheel 197 and communicates power to a succeeding shaft by a chain engaging the sprocket wheel 198. An additional sprocket wheel 199 is shown on said shaft 190 for changing ratios of speed of the successive sets of carrier chains. From shaft to shaft the transmission chains may be supported on idle guide wheels, as indicated at 200 in Fig. 21.

As shown in Figs. 13 and 14, the return conveyor chains 183 are trained around driving sprocket wheels on a shaft 201 which is driven by chains 202 from the same shaft 196 which drives the chain transmissions 195 for the carriers which convey the sticks and hanging festoons of board through the drying room. At the delivery end of the drying room, (Fig. 18) the return conveyor chains are trained around sprockets on a shaft 203, from which the ejecting wheels 182 may be driven by a chain transmission or other suitable connection.

The shaft 196 (Figs. 13 and 14) is driven by chains 204 from a shaft 205 below the floor of the plant (Figs. 13 and 14), and the last mentioned shaft 205 is driven by chain 206 from suitable transmission mechanism, including, if desired, a Reeves variable speed transmission, which in turn may be driven from the power plant which operates the board-making machine. The drives for the coating machine and drying room system may be connected and simultaneously controlled.

The various conveying chains of the drying room conveying system may run over suitable supporting rails, and may be associated with suitable side guides to prevent displacement of the sticks longitudinally, or in a direction transverse of the board sheet. Such supporting rails for certain of the chains are shown at 208 in Figs. 14, 18, 20 and 23. Side guides to prevent endwise displacement of the sticks are shown at 209 in Figs. 19, 20 and 21.

The overhead rollers 160, 166 and 169 (Figs. 4, 17 and 18), over which the board sheet may be trained for shifting the points of suspension of the board from the sticks, may be driven by sprocket chains from certain of the stub shafts 191, as indicated at 210 in Figs. 15 and 16. In Fig. 21, one of such overhead rollers is shown, the shaft 211 of said roller having a sprocket wheel 212 for engagement by its driving chain.

From the foregoing description, it will be seen that the coated board hanging in festoons or folds is slowly conveyed through the drying room by a succession of conveying means running at alternate rates of speed, so as alternately to contract and spread out the festoons to the action of the descending hot air currents; while the conveyance of the board in this manner is accompanied by one or more shiftings of the board sheet to change the points of suspension of the board from the sticks, or in other words to cause the board to hang on the sticks from portions which were previously suspended between the sticks. These actions contribute to promote efficient and uniform drying of the board; while the successive shifting of the points of support prevents formation of undesirable bends or ruffles in the board sheet and checking of its coated surface.

The passage of the board sheet over one or more of the overhead rollers 160, 166 and 169 (Figs. 4, 17 and 18), causes the coated surface of the running board to be uniformly subjected to the action of the hot air blasts in close proximity to the air ducts 131, as will be apparent from Figs. 4 and 21. This again contributes to efficient and uniform drying. It may, however, be unnecessary, or undesirable in some cases, depending upon the character of the board sheet under treatment and the nature and thickness of the applied coating, to run the board over all of the overhead rollers, especially first roller 160 (Fig. 15). For instance, in some cases the liquid coating may be in too fresh or wet a condition for close exposure to the hot air blasts while in the portion of the conveying system shown in Fig. 15; and in the cases of board coated with a thin or quickly drying composition the close exposure to the hot air supplied at all of the shifting sections of the conveyor might result in too severe or sudden drying, rendering it expedient to carry the board sheet under one or more of the overhead rollers as indicated in Fig. 15. If desired, the bottom discharge slots of the overhead ducts 131 may be closed at those portions of the ducts which overlie the overhead rollers, so as to permit a succession of shiftings of the board on the sticks without accompanying severe drying treatment.

The accumulating capacity of the drying room equipment may be varied by speed adjusting, as previously explained with reference to the hang-up equipment between the board-making and coating machines; and by the provision of one or more sets of dead rack rails 171 in association with the conveying chains at the delivery end of the drying room, such as shown in Figs. 18 and 20. Thus in event of any temporary interruption of operation of machinery beyond the drying room, the coating machine and drying room system may continue in operation and the hanging folds of dried board may be accumulated in the delivery end of the drying room, by bringing dead rack bars into play; while, on the other hand, a reserve supply of slack board hanging in closely crowded folds may be maintained on the declined delivery rails and also if desired on the dead rack bars from which the board may be continuously drawn for the finishing and cutting operations in event of temporary suspension of the coating operation and accompanying stoppage of the drying room conveying system.

From the delivery end of the drying room, the board is drawn to and through the calendering or finishing machine 230 (Figs. 1, 5 and 25), in such manner as gradually to take up the slack and to tension the board against the action of the calendering rolls. As the board is withdrawn from the sticks on the declined rails at the delivery end of the drying room, it is subjected to the dragging action of the swinging wiper 177 (Figs. 4 and 18). In this instance a further resistance is exerted by drawing the board from the drying room over an elevated platform 215, having side guides 216 to maintain the board sheet in proper longitudinal alignment; and thence runs over a curved guide 218 comprising transverse rods extending between curved supporting bars which also guide the edges of the board sheet. The board is then trained around a set of rollers 220, 221 and 223, from which the board is drawn taut through the calendering rolls of the finishing machine 230, which finish the coated surface of the board. Said rollers 220, 221 and 223 are not power driven, except initially for threading the board through the machine. They may be intergeared and suitably clutch connected with appropriate driving means to permit such initial driving and then to release them for idling. A braking means may be associated with these rolls, for instance a brake coacting with the shaft of one of them or with a brake wheel thereon, to create a resistance to turning of the rolls for tensioning the board as required. Coacting with the tensioning roll 221 is a rotating brush 224 for brushing the coated surface of the board prior to running the board through the calendering machine, and also presser roll 225 for smoothing purposes.

As the board runs from the drying room, it may be exposed to the action of hot air blasts discharged from suitable pipes 217 for the purpose of additional or superdrying action, and to heat the coated surface advantageously for the finishing operation. Associated with the calendering rolls of the finishing machine 230 are pipes 231 for discharging hot air against the back or uncoated surface of the board.

From the calendering machine 230, the board is run through any suitable subdividing machine 240 for cutting and delivering the board in cut sheets. In the illustrative cutting machine, the edges of the board sheet are trimmed by coacting disks 241, and the sheet is longitudinally cut by coacting cutting disks 242; while transversely divided by rotating cutters 243 coacting with fixed cutters 244. The cut sheets 247 drop upon the conveyor 248 and are delivered into compartments 251 of a truck 250 running on rails 252. The cutting machine illustrated is arranged for delivering three cut sheets at a time. Accordingly, the truck 250 has six compartments. In the full line position of the truck shown in Fig. 25, three of the compartments of the truck are arranged to receive the cut sheets delivered from the subdividing machine. When these compartments are filled the truck may be moved to the dotted line position indicated in Fig. 25, so that the cutting machine may continuously discharge into the other three compartments of the truck while the sheets may be removed from the displaced compartments and immediately packaged for shipment.

Should it be desired to package the coated board in rolls, the board sheet may be run backwardly from the calendering machine 230 over a guide roller 255, reeled on the reels 256 and thence passed through the trimming machine 257 and rereeled on the rereeling rolls 258. This equipment for delivering the coated sheet in rolls is conveniently located under the elevated platform 215.

The calendering and subdividing machines and reeling and rereeling equipment may be driven from the power source of the plant by any appropriate means permitting disconnection of said machines from the power source when required and adapted for synchronously operating the calendering and subdividing machines or the calendering and reeling machines according to circumstances. The driving means for these machines should permit variable speed control as required.

From the foregoing description of the illustrative plant, it will be seen that the sheet of board continuously discharging from the board-making machine is hung up and slowly conveyed in hanging condition for seasoning and storage purposes; and from the supply thus accumulated the board is drawn through the coating machine with gradual tensioning and in such manner as to present the top calendered surface of the board to the coating operation and to deliver the board sheet from the coating machine with its coated side uppermost. The coated board is hung up in successive festoons or folds and slowly conveyed during drying action, accompanied by shifting of the points of suspension of the board and alternate contracting and spreading of the folds. The dry coated board accumulates in hanging folds in the far end of the drying room, and from this supply the board is again drawn out with gradual tensioning through the final treating appliances which, in this instance, comprise a calendering machine for finishing the coated surface of the board and a machine for cutting the board into sheets.

Thus while the continuous board sheet is running continuously from the board-making machine and through the machines for coating and finishing the board, relatively stagnant accumulations of the sheet are maintained between these successive machines, the amounts of which accumulations may be varied to suit requirements and exigencies of operation of the plant; thus "flexible accumulations" of the continuous board are maintained so that the system is rendered so elastic as to permit continuous production of the raw board notwithstanding occasional necessary stoppages of a subsequent unit of the plant, and in general to permit such temporary interruptions in the operation of the coating machine as are required for practical reasons without interrupting the operation of the plant as a whole and the continuous production of the finished product at the delivery section of the plant.

By this continuous method of manufacture, the time, labor and expense of reeling and handling the board between successive stages of manufacture are eliminated; and as the board runs in a continuous sheet from its source of production to the point of delivery of the finished product, and is hung up in slack condition between successive machines, the opportunity for damaging the board is reduced to a minimum. These factors, together with the increased output of finished board incident to performance of successive stages of manufacture in a continuous process, result in a great saving in cost of production.

The method described has an important effect upon the quality of product, particularly as to its stiffness and snappy characteristics. During the greater portion of the entire time between the calendering of the raw board and the delivery of the finished product, the board sheet is stored in hanging festoons or folds between successive machines, being thus maintained in open formation and slack condition throughout the major portion of its length; and the sheet is tensioned only in running it through the successive machines. Furthermore the transition of the sheet from slack to tensioned condition is gradual, or without sudden severe stretching; and there is comparatively little flexing or bending of the sheet under tension, while such flexing as occurs is only of momentary duration on the portion of the running sheet in course of treatment. Hence the board remains wholly unaffected by intermediate reeling and substantially unaffected by sharp bending or flexing back and forth under tension. This results in production of a finished product having the maximum stiffness and snappy character consistent with the constituency and thickness of the board material.

Prior to the present invention, the ordinary commercial manufacture of coated board involved the production of the raw board in dried and calendered condition in a board-making plant; reeling the output from the board-making machine and then unreeling and parsing it through a trimming machine and rereeling it into even edged rolls; transporting these rolls to a coating plant; mounting the rolls one at a time in a reel associated with a coating machine; drawing the board through the coating machine and then through a drying room; reeling the coated board delivered from the drying room and unreeling and rereeling it to form an even edged roll; removing the roll of coated board to a calendering or finishing machine, and again mounting it in a reel, drawing it through the finishing machine and reeling, unreeling and rereeling the finished board into an even edged roll, either for merchantable purposes or for removal to still another machine through which the board was drawn from the roll and cut into sheets.

Thus the board material, between the stages of production of the raw board and the delivery of the finished coated product, was repeatedly reeled, unreeled and rereeled, thereby subjecting the fabric to strain and flexure under tension, with consequent tendency to diminish the stiffness and snappy charactertistic of the board. Furthermore the storage of the board in rolled-up condition between successive stages of manufacture caused it to set in rolled-up form, with consequent tendency to resume its curvature during ensuing stages of treatment and in the finished state, thereby diminishing the capacity of the board to stand up stiff in the carton.

Aside from these disadvantageous effects upon the quality of the board, incident to the ordinary method of manufacture referred to, a tremendous consumption of time and labor was involved in the reeling, unreeling and rereeling of the board, storing and transporting the rolls from plant to plant or from machine to machine, and in setting up and taking down the rolls of board in and from the respective machines, with accompanying interruptions of operation during the intervals between treatment of one roll and the insertion of a new roll in a machine. Furthermore these operations entailed a tremendous waste of material, due to more or less damage of the board in reeling and unreeling and particularly to damage of the board in handling and transporting the rolls of board and setting up the rolls in and taking them from the rolls of the respective machines. Generally speaking, the output of finished coated board from a given roll of raw board was anywhere from five to fifteen per cent less than the amount of raw board in the original roll.

The foregoing disadvantages are obviated by the present invention, which provides a practicable method and means for manufacturing coated paper board in a continuous process, without rolling up the material, or subjecting it to any considerable flexing under tension, between the stages of production of the raw board and the delivery of the coated board in merchantable form; thereby eliminating all the intermediate reelings and unreelings and movements of the rolls from one machine to another and handling them in successive machines. This effects a great saving in cost of production, minimizes waste due to damaged material, and promotes uniformity of production of coated board of superior quality as to stiffness and snappy character.

The coating unit herein illustrated by Fig. 12 is claimed in our copending application, Serial No. 690,905, and claims to the hang-up device are made in our application, Serial No. 482,142.

Having thus described an illustrative embodiment of our invention, we claim:

1. A method of making coated board by successively forming, drying, calendering, coating, drying and finishing continuous board without reeling it between successive stages of manufacture.

2. A method of making coated board characterized by continuously producing raw board in a continuous web; continuously delivering said web to a flexible accumulation thereof; drawing the web from said accumulation; and coating the web while drawing it from said accumulation.

3. A method of making coated board characterized by continuously producing raw board in a continuous web; continuously delivering said web to a flexible accumulation thereof; maintaining an extensive quantity of the board stored in said accumulation while exposing the same to air-seasoning action; drawing the board from said accumulation; and coating the board while drawing it from said accumulation.

4. A method of making coated board characterized by maintaining a flexible accumulation of slack board in a continuous web; continuously forming said board web in advance of while continuously delivering it to said accumulation; drawing the web from said accumulation; tensioning the web; and coating the web while running under tension beyond said accumulation.

5. A method of making coated board characterized by continuously producing raw board in a continuous web; continuously delivering said web to a flexible accumulation thereof; drawing the web from said accumulation while aligning, smoothing and tensioning the web; and coating the web while running in smooth and tensioned condition beyond said accumulation.

6. A method of making coated board continuously with the formation of the raw board, characterized by maintaining an accumulation of slack board in a continuous board line; continuously forming the board in advance of and delivering it to said accumulation; withdrawing the board from said accumulation with gradual tensioning; and applying a liquid coating to the board while so withdrawing it from said accumulation.

7. A method of making coated board continuously with the formation of the raw board, characterized by maintaining continuity of board from a source of production to a delivery point; continuously forming the board at said source; maintaining lineally running portions of the board in tensioned state; applying a liquid coating to the board thus running at one point; drying the coated board; subjecting the board to finishing treatment while running under tension at another point; and maintaining flexible accumulations of slack board in the continuous board line between the stages of production and coating and between the stages of coating and finishing permitting variations in the rates of said operations without affecting the tensioning of the aforesaid lineally running portions of the board.

8. A method of making coated board characterized by continuously forming the board; running the board from its source of production to a remote delivery point while maintaining relatively stagnant accumulations of slack board alternating with tensioned portions of running board; applying a liquid coating to the tensioned board running beyond a said accumulation; drying the coated board stored in slack condition in a succeeding accumulation; and applying finishing treatment to the coated surface of the dry board running in tensioned state beyond the last mentioned accumulation.

9. A method of making coated board continuously with the formation of the raw board, characterized by maintaining relatively stagnant accumulations of slack board in a continuous board line; continuously forming and delivering board to a said accumulation; withdrawing the board from said accumulation with gradual tensioning; applying a liquid coating to the board while so withdrawing it; subjecting the board to drying treatment while stored in a succeeding accumulation; withdrawing the board from said succeeding accumulation with gradual tensioning; and finishing the coated surface of the dry board being so withdrawn from said succeeding accumulation.

10. A method of making coated board continuously with the formation of the raw board, characterized by maintaining relatively stagnant accumulations of slack board in a continuous board line; continuously forming and delivering board to a said accumulation; withdrawing the board from said accumulation with gradual tensioning; applying a liquid coating to the board while so withdrawing it; subjecting the board to drying treatment while stored in a succeeding accumulation; withdrawing the board from said succeeding accumulation with gradual tensioning; finishing the coated surface of the dry board being so withdrawn from said succeeding accumulation and subdividing the board and delivering the same in cut sheets.

11. A method of making coated board characterized by continuously producing raw board in a continuous web; continuously delivering said web to a flexible accumulation thereof; drawing the web from said accumulation; coating the web while drawing it from said accumulation; drying the coated board while accumulating a flexible supply thereof; and finishing the board while drawing it from said last mentioned supply.

12. A method of making coated board characterized by continuously producing raw board in a continuous web; continuously delivering said web to a flexible accumulation thereof; drawing the web from said accumulation; coating the web while drawing it from said accumulation; manipulating the web while undergoing the coating operation to expose its top surface to the coating action while causing the web to traverse an arcuate course and delivering it coated side uppermost; drying the coated web while accumulating a flexible supply thereof; and finishing the web while drawing it from said last mentioned supply.

13. A method of making coated board characterized by continuously producing raw board in a continuous web; continuously delivering said web to a flexible accumulation thereof; drawing the web from said accumulation; coating the web while drawing it from said accumulation; drying the web while accumulating a flexible supply thereof in slack condition; drawing the web from said supply while tensioning the web; and finishing the web while drawing it in tensioned state beyond said supply.

14. A method of making coated board characterized by continuously producing raw board in a continuous web; continuously delivering said web to a flexible accumulation thereof; drawing the web from said accumulation; coating the web while drawing it from said accumulation; drying the web while accumulating a flexible supply thereof in slack condition; drawing the web from said supply while aligning, smoothing and tensioning the web; and finishing the web by supercalendering while drawing it tense.

15. A method of making coated board characterized by continuously producing raw board in a continuous web; continuously delivering said web to a flexible accumulation thereof; exposing an extensive quantity of the web to air-seasoning action in said accumulation; drawing the web from said accumulation; coating the web while drawing it from said accumulation; drying the coated web while accumulating a flexible supply thereof in slack condition; drawing the web from said supply while smoothing and tensioning the same; and finishing the web while drawing it in tensioned state beyond said supply.

16. A method of making coated board characterized by maintaining continuity of board from a source of production to a delivery point; maintaining a flexible accumulation of the continuous board; continuously forming the board at said source while continuously delivering the same to said accumulation; drawing the board from said accumulation while applying a liquid coating thereto; accumulating a flexible supply of the dry coated board in slack condition; drawing the board from said supply while smoothing and progressively tensioning the board until it is drawn tense; and finishing the board by supercalendering while drawing it tense.

17. A method of making coated board characterized by producing, coating, drying and finishing while maintaining continuity of board between the producing and finishing operations, and maintaining in the continuous board line flexible accumulations thereof between the producing and coating operations and between the coating and finishing operations, thereby permitting continuity of production and finishing in event of temporary interruption of coating.

18. A plant for making coated board comprising, in combination, means for continuously producing raw board in a continuous web; means for maintaining a flexible accumulation of the web, to which the web is continuously delivered from said producing means and from which the web is drawn for coating; and means for drawing the web from said accumulation and coating the same while so drawing it from said accumulation.

19. A plant for making coated board comprising, in combination, means for continuously producing raw board in a continuous web; means to which the web is continuously delivered for maintaining a flexible accumulation of the web in slack condition; means for drawing the web from said accumulation and coating the same while so drawing it from said accumulation;

and means for gradually tensioning the web as it is drawn from said accumulation to the coating means.

20. A plant for making coated board comprising, in combination, means for producing a continuous board sheet; means for accumulating a flexible supply of the board delivered from said producing means; coating means through which the board is drawn from said supply; means for drying the board; means for accumulating a flexible supply of the dry coated board; and a finishing machine through which the board is drawn from said last named supply.

21. A plant for making coated board comprising, in combination, means for producing a continuous board sheet; means for accumulating a flexible supply of the board delivered from said producing means; coating means through which the board is drawn from said supply; means for drying the board; means for accumulating a flexible supply of the dry coated board; and finishing and subdividing machines through which the board is drawn from said last named supply.

22. A plant for making coated board comprising, in combination, means for maintaining accumulations of slack board alternating with running tensioned portions of board in a continuous board line; means for continuously producing the board and delivering to an accumulation; means for coating the board while it runs from one accumulation to another; means for drying the board in a succeeding accumulation; and means for finishing the coated surface of the board beyond such succeeding accumulation.

23. A plant for making coated board comprising, in combination, board-making and coating machines arranged for producing and coating board while maintaining its continuity between production and coating; means for maintaining an accumulation of slack board between said machines; and means for varying the accumulating capacity of said accumulating means.

24. A plant for making coated board comprising, in combination, board-making and coating machines arranged for producing and coating board while maintaining its continuity between production and coating; means for hanging up and conveying the board in festoons or folds between said machines; and speed-adjusting means for varying the length of board accumulated in such hanging folds.

In testimony whereof, we have signed our names to this specification.

CHARLES C. COLBERT.
GEORGE EDWARD PRESTON.